US011002389B2

(12) United States Patent
Lee et al.

(10) Patent No.: US 11,002,389 B2
(45) Date of Patent: May 11, 2021

(54) ONE-TOUCH PIPE CONNECTION DEVICE

(71) Applicants: PPI PYUNGWHA CO., LTD., Hwaseong-si (KR); PPI AMERICA INC., Chicago, IL (US); Hye-Jung LEE

(72) Inventors: Jong-Tae Lee, Seoul (KR); Ki-Woong Hwang, Yangju-si (KR)

(73) Assignees: PPI PYUNGWHA CO., LTD., Hwaseong-si (KR); PPI AMERICA INC., Chicago, IL (US); Hye-Jung Lee, Chicago, IL (US)

( * ) Notice: Subject to any disclaimer, the term of this patent is extended or adjusted under 35 U.S.C. 154(b) by 364 days.

(21) Appl. No.: 15/768,654

(22) PCT Filed: Oct. 16, 2017

(86) PCT No.: PCT/KR2017/011392
§ 371 (c)(1),
(2) Date: Apr. 16, 2018

(87) PCT Pub. No.: WO2018/105877
PCT Pub. Date: Jun. 14, 2018

(65) Prior Publication Data
US 2019/0063643 A1 Feb. 28, 2019

(30) Foreign Application Priority Data

Dec. 6, 2016 (KR) .......................... 10-2016-0165146

(51) Int. Cl.
*F16L 19/00* (2006.01)
*F16L 17/02* (2006.01)
(Continued)

(52) U.S. Cl.
CPC ............... *F16L 17/02* (2013.01); *F16L 19/00* (2013.01); *F16L 19/07* (2013.01); *F16L 21/02* (2013.01); *F16L 21/04* (2013.01); *F16L 37/02* (2013.01)

(58) Field of Classification Search
CPC ......... F16L 19/00; F16L 19/06; F16L 19/075; F16L 21/007; F16L 21/04; F16L 21/02
(Continued)

(56) References Cited

U.S. PATENT DOCUMENTS 2,114,771 A * 4/1938 Turner .................. F16L 19/075
285/341
2,452,278 A * 10/1948 Woodling ............... F16L 19/12
285/343
(Continued)

FOREIGN PATENT DOCUMENTS

DE 3637975 A1 5/1988
EP 3428498 A1 * 1/2019 .............. F16L 21/04
(Continued)

OTHER PUBLICATIONS

International Search Report of PCT/KR2017/011392 dated Feb. 8, 2018 [PCT/ISA/210].
(Continued)

*Primary Examiner* — David Bochna
(74) *Attorney, Agent, or Firm* — Sughrue Mion, PLLC

(57) ABSTRACT

A one-touch pipe connection device includes a socket main body portion including a plurality of pipe fitting portions in each of which a pipe is inserted; a sealing portion that provides sealing between the socket main body portion and the pipe; and a cap portion having a through hole through which the pipe is inserted into the pipe fitting portion and configured to be coupled to the pipe fitting portion by rotation while moving towards the pipe fitting portion such
(Continued)

that the sealing portion is pressed and deformed to closely contact the pipe.

12 Claims, 17 Drawing Sheets

(51) Int. Cl.
*F16L 37/02* (2006.01)
*F16L 21/02* (2006.01)
*F16L 19/07* (2006.01)
*F16L 21/04* (2006.01)

(58) Field of Classification Search
USPC .................................. 285/342, 343, 354
See application file for complete search history.

(56) References Cited

U.S. PATENT DOCUMENTS

| | | | | |
|---|---|---|---|---|
| 2,561,887 | A | * | 7/1951 | Risley .................. F16L 19/06 285/341 |
| 2,703,719 | A | * | 3/1955 | Crothers ................ F16L 41/14 277/622 |
| 2,780,483 | A | * | 2/1957 | Kessler ............... F16L 19/0218 285/332.3 |
| 4,353,580 | A | * | 10/1982 | Houck .................. F16L 41/14 285/141.1 |
| 4,395,060 | A | * | 7/1983 | Lapham ............... F16L 19/075 285/231 |
| 4,475,748 | A | * | 10/1984 | Ekman ............... F16L 19/0206 285/12 |
| 4,779,903 | A | * | 10/1988 | Maier ................... F16L 21/04 277/626 |
| 9,611,958 | B1 | * | 4/2017 | Carter, Jr. .............. F16L 19/08 |
| 9,671,049 | B1 | * | 6/2017 | Crompton .............. F16L 19/07 |
| 2001/0013700 | A1 | * | 8/2001 | Mintz ................... F16L 21/04 285/360 |
| 2002/0171243 | A1 | * | 11/2002 | Jost .................... F16L 19/0218 285/354 |
| 2003/0197380 | A1 | * | 10/2003 | Chelchowski ........ F16L 19/065 285/354 |

FOREIGN PATENT DOCUMENTS

| | | | | |
|---|---|---|---|---|
| FR | 2041651 | A6 | * | 1/1971 ............ F16L 16/075 |
| FR | 2079912 | A6 | * | 11/1971 ............ F16L 19/075 |
| GB | 525153 | A | * | 8/1940 ............ F16L 19/075 |
| GB | 742110 | A | * | 12/1955 ............ F16L 19/075 |
| GB | 1586862 | A | | 3/1981 |
| JP | 11218273 | A | | 8/1999 |
| JP | 2000-46265 | A | | 2/2000 |
| JP | 4205153 | B1 | | 1/2009 |
| KR | 20-1993-0004986 | Y1 | | 7/1993 |
| KR | 10-0363956 | B1 | | 12/2002 |
| KR | 10-0597167 | B1 | | 7/2006 |
| KR | 101020744 | B1 | | 3/2011 |
| KR | 10-2014-0081223 | A | | 7/2014 |
| KR | 10-2016-0103701 | A | | 9/2016 |
| WO | 2012/096042 | A1 | | 7/2012 |

OTHER PUBLICATIONS

Communication dated Apr. 3, 2020, from the European Patent Office in application No. 17879421.0.

* cited by examiner

ONE-TOUCH PIPE CONNECTION DEVICE

TECHNICAL FIELD

The present disclosure relates to a one-touch pipe connection device, and more particularly, to a one-touch pipe connection device for connecting pipes.

BACKGROUND ART

A hollow flow tube, which is typically called a pipe, is used to supply a fluid such as tap water or gas. A valve for opening or closing a flow of a fluid is used along with a pipe. An appropriate pipe coupling is used on a portion connecting pipes or a pipe and a valve.

A pipe coupling requires a structure to facilitate connection of pipes, prevent leakage of a fluid from a connection portion, and surely prevent inappropriate detachment of a pipe from a pipe connection portion.

A typical pipe coupling employs a rubber ring for maintaining hermetic sealing between a pipe coupling and a pipe connected to the pipe coupling and an appropriate fastening member to prevent detachment of the pipe.

A rubber ring is provided between an outer circumferential surface of a pipe inserted in a pipe coupling and an inner circumferential surface of the pipe coupling to hermetically seal between the pipe and the pipe coupling. A fastening member is provided to prevent detachment of a pipe from the fastening member by fastening the outer circumferential surface of the pipe as an internal diameter of the fastening member is reduced when coupling the pipe.

The above-described connection between the pipe coupling and the pipe according to the related art, that is, a pipe connection work, is performed by the following method. In other words, prior to the connection between the pipe and the pipe coupling, the fastening member is first inserted around the outer circumferential surface of the pipe and then the rubber ring is inserted around the outer circumferential surface of the pipe.

Then, after the pipe with the fastening member and the rubber ring inserted around the outer circumferential surface thereof is inserted in the pipe coupling, the fastening member is coupled to the pipe in a screw coupling manner such that the outer circumferential surface of the pipe is fastened by the fastening member. Thus, the connection between the pipe coupling and the pipe is completed in a manner in which the pipe is not detached from the fastening member and the pipe coupling.

Accordingly, the rubber ring forms a seal between the pipe and the pipe coupling, and the fastening member fixes the pipe connected to the pipe coupling not to be detached from the pipe coupling, thereby completing the connection between the pipe coupling and the pipe.

According to the above pipe connection structure, whenever the pipe coupling and the pipe are connected to or disconnected from each other, additional works such that the fastening member is completely separated from the pipe coupling and the rubber ring is manually inserted around the pipe or released therefrom.

This is because the inner diameter of the rubber ring is smaller than the outer diameter of the pipe to increase a sealing force between the pipe and the rubber ring. In other words, since the inner diameter of the rubber ring is smaller than the outer diameter of the pipe, a work of manually inserting the rubber ring around the pipe or releasing the rubber ring therefrom at every connection and disconnection work between the pipe coupling and the pipe. Accordingly, a work of completely separating the fastening member from the pipe coupling is needed for each connection and disconnection work between the pipe coupling and the pipe.

As such, when the inconvenient works of manually inserting the rubber ring around the pipe or releasing the rubber ring therefrom and completely releasing the fastening member and coupling the fastening member again are added to each pipe connection work, there are various difficulties and inconveniences in the pipe connection work, for example, a connection work speed between the pipe coupling and the pipe may be delayed, and parts such as the rubber ring and the fastening member that are separated during the work may be lost.

DISCLOSURE

Technical Problem

It is an object of the present disclosure to provide a one-touch pipe connection device having an improved structure to make a pipe connection work easy and quick.

Technical Solution

In accordance with one aspect of the present disclosure, a one-touch pipe connection device including a socket main body portion, wherein a plurality of pipe fitting portions, in each of which a pipe to be connected is inserted, are connected to each other, a sealing portion provided between the socket main body portion and the pipe to be connected and sealing between the pipe to be connected inserted in the pipe fitting portion and the socket main body portion, and a cap portion having a through hole therein for passing the pipe to be connected inserted in the pipe fitting portion, coupled to the pipe fitting portion while moving in an insertion direction of the pipe to be connected inserted in the pipe fitting portion, and, when coupled to the pipe fitting portion, pressing the sealing portion in a direction in which the sealing portion closely contacts the pipe to be connected.

The sealing portion includes a first sealing member that is provided at a side of an open entrance of the pipe fitting portion coupled to the cap portion and sealing between an inner circumferential surface of the pipe fitting portion and an outer circumferential surface of the pipe to be connected.

Furthermore, the cap portion includes a pressure guide portion that induces flexural deformation of the first sealing member by pressing other side of the first sealing member in a lengthwise direction in the insertion direction when the cap portion moves the insertion direction of the pipe to be connected.

In an embodiment of the present disclosure, the first sealing member may have an oval section in which a major axis is formed in the insertion direction.

Furthermore, in an embodiment of the present disclosure, the first sealing member may have an inner diameter equal to or greater than an outer diameter of the pipe to be connected and has an elastically deformable ring shape.

Furthermore, in an embodiment of the present disclosure, a guide support groove portion having a shape corresponding to a surface of an end portion of one side of the first sealing member in the lengthwise direction may be formed at a side of an entrance of the pipe fitting portion toward an inner side of the pipe fitting portion in a lengthwise direction from an end portion of an entrance side of the pipe fitting portion, an inner support wall may be formed at a side of the guide support groove portion adjacent to the inner circumferential surface of the pipe fitting portion, and an outer support wall may be formed at a side of the guide support groove portion adjacent to an outer circumferential surface of the pipe fitting portion.

Furthermore, in an embodiment of the present disclosure, the first sealing member may be fixed at the entrance side of the pipe fitting portion by fitting in the guide support groove portion such that an inner circumferential surface is supported by the inner support wall and an outer circumferential surface supported by the outer support wall.

Furthermore, in an embodiment of the present disclosure, the one side of the first sealing member in the lengthwise direction may be supported by the guide support groove portion, and the other side of the first sealing member in the lengthwise direction may contact the pressure guide portion when the cap portion is coupled to the pipe fitting portion.

Furthermore, in an embodiment of the present disclosure, when the cap portion moves in the insertion direction of the pipe to be connected, the end portion of the other side of the first sealing member in the lengthwise direction may be inserted, in a wedge shape, in a space formed by the outer circumferential surface of the pipe to be connected and an inclined surface formed on the pressure guide portion, such that one surface of an end portion of the other side of the first sealing member in the lengthwise direction closely contacts the outer circumferential surface of the pipe to be connected and other surface of the end portion of the other side of the first sealing member in the lengthwise direction closely contacts the inclined surface formed on the pressure guide portion.

Furthermore, in an embodiment of the present disclosure, when the cap portion moves in the insertion direction of the pipe to be connected, the other side of the first sealing member in the lengthwise direction may slide along the inclined surface formed on the pressure guide portion pressing the other side of the first sealing member in the lengthwise direction, and have flexural deformation in a direction toward a center of the ring-shaped portion.

Furthermore, in an embodiment of the present disclosure, the cap portion may include a ring-shaped portion having the through hole formed therein to pass therethrough and having an inner surface facing an inner side of the pipe fitting portion and an outer surface facing an outer side of the pipe fitting portion, and a skirt portion extending from an edge of the ring-shaped portion in the insertion direction.

Furthermore, in an embodiment of the present disclosure, the inclined surface formed on the pressure guide portion may protrude less in a direction toward a center of the through hole as it is closer to a side of an inner circumferential surface of the skirt portion, and protrude further toward the center of the through hole as it is closer to a side of an inner circumferential surface of the ring-shaped portion.

Furthermore, in an embodiment of the present disclosure, a first screw coupling portion may be formed on an outer circumferential surface of an entrance side of the pipe fitting portion, a second screw coupling portion to be screw-coupled to the first screw coupling portion may be formed on an inner surface of the cap portion, and the cap portion may be coupled to the pipe fitting portion by screw coupling made between the first screw coupling portion and the second screw coupling portion.

Furthermore, in an embodiment of the present disclosure, a support step portion may be formed between the pipe fitting portion and the pipe connection portion to connect the pipe fitting portion and the pipe connection portion with a step therebetween, and a position of the pipe to be connected inserted in the pipe fitting portion in the insertion direction may be restricted as an end portion of one side of the pipe to be connected in the lengthwise direction interference with the support step portion.

Furthermore, in an embodiment of the present disclosure, the sealing portion further may include a second sealing portion that is provided between the support step portion and the pipe to be connected and sealing between the socket main body portion and the end portion of the one side of the pipe to be connected in the lengthwise direction, the support step portion may have an outer diameter corresponding to an inner diameter of the pipe fitting portion and includes a flat surface having a ring shape having an inner diameter corresponding to an inner diameter of the pipe connection portion, and the second sealing member may include a flat surface corresponding to the flat surface having a ring shape of the support step portion.

Furthermore, in an embodiment of the present disclosure, the socket main body portion may include a plurality of pipe fitting portions that are connected to each other, forming any one of a "⌐" shape, a "—" shape, a "T" shape, and a "+" shape.

Furthermore, in an embodiment of the present disclosure, a grip groove may be formed on the cap portion to be concave on an outer circumference surface of the skirt portion and open to outside of the skirt portion and toward the ring-shaped portion, and the grip groove may include a plurality of grip grooves arranged along a circumferential direction of the cap portion to be spaced apart from each other at an interval.

Advantageous Effects

According to the one-touch pipe connection device according to the present disclosure, when parts such as the first sealing member, the second sealing member, and the cap portion are coupled to the socket main body portion, a connection and disconnection work of a pipe to be connected may be performed by slightly releasing the cap portion only without separating the parts, thereby making the pipe connection and disconnection work easy and quick. Furthermore, since there is no concern about loss of various parts required for a pipe connection work, workability may be improved and a work cost may be reduced.

Furthermore, according to the present disclosure, with a simple work of coupling the cap portion to the pipe fitting portion, a pipe to be connected may be firmly fixed to the one-touch pipe connection device without detachment therefrom and the pipe to be connected may be connected to the one-touch pipe connection device. Furthermore, sealing performance by using a sealing operation performed at two different positions using the first sealing member and the second sealing member may be further reinforced.

BEST MODE

Figure 1:
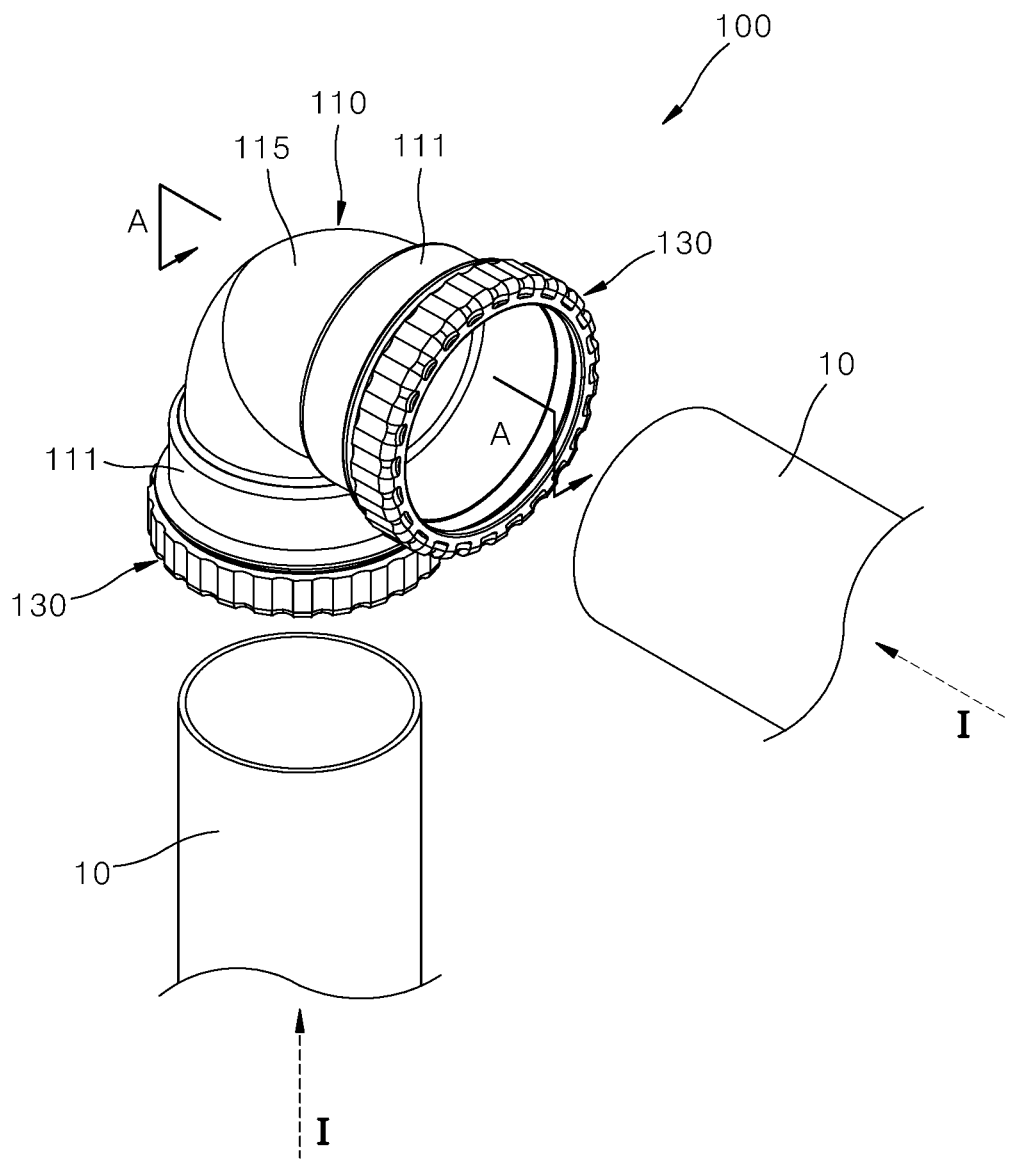
FIG. 1 is a perspective view illustrating a release state of a one-touch pipe connection device according to a first embodiment of the present disclosure.

Hereinafter, embodiments of a one-touch pipe connection device according to the present disclosure will now be described with reference to the accompanying drawings. The thicknesses of lines or the sizes of constituent elements illustrated in the drawings may be exaggerated for convenience of explanation and clarity. Furthermore, the terms used in the present disclosure are defined in consideration of the functions in the present disclosure, which may vary according to users, the intention of an operator, or case precedents. Accordingly, the terms used in the present disclosure are defined based on their meanings in relation to the contents discussed throughout the specification, not by their simple meanings.

Figure 2:
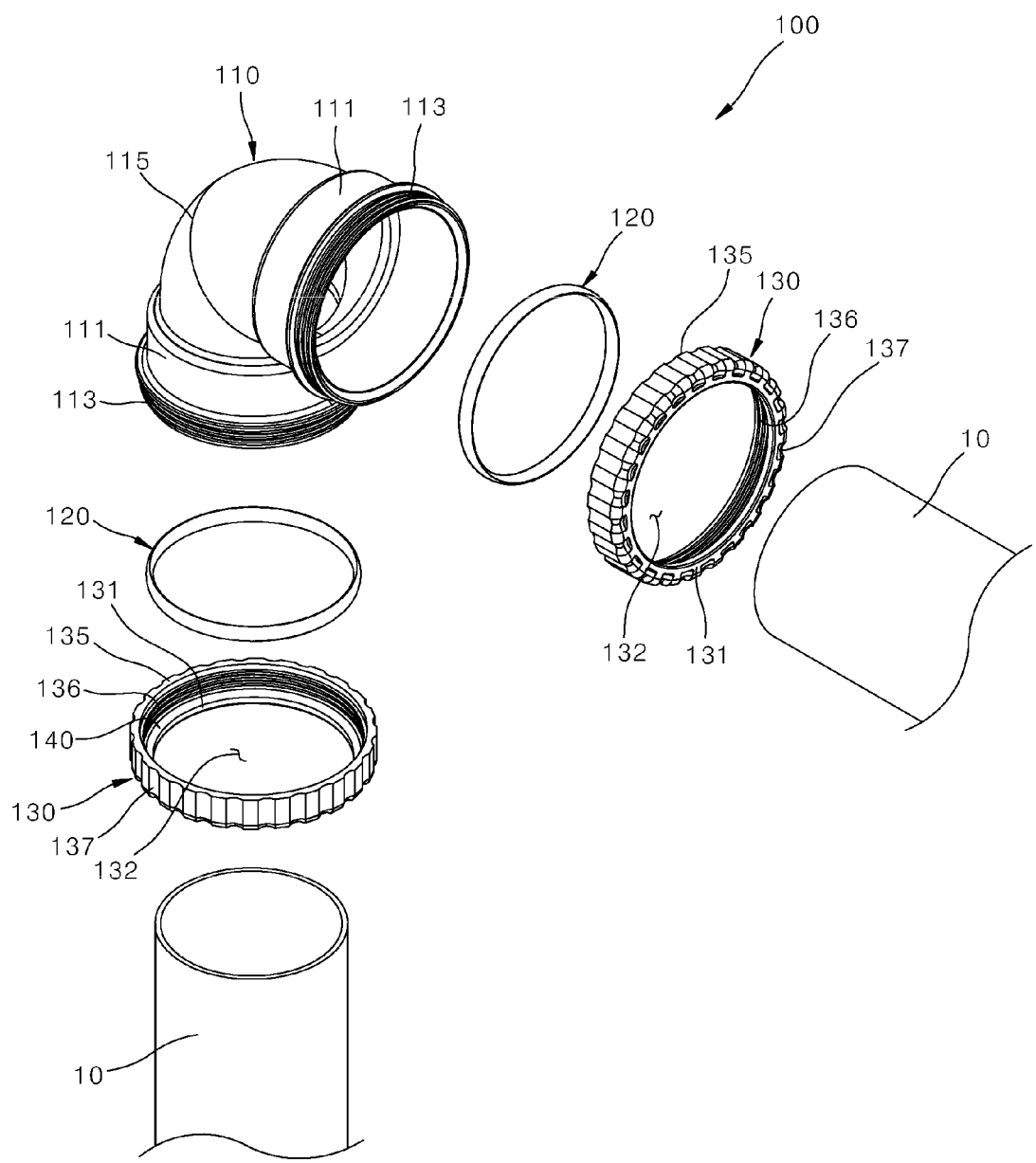
FIG. 2 is an exploded perspective view of a partial configuration of the one-touch pipe connection device of FIG. 1.
Figure 3:
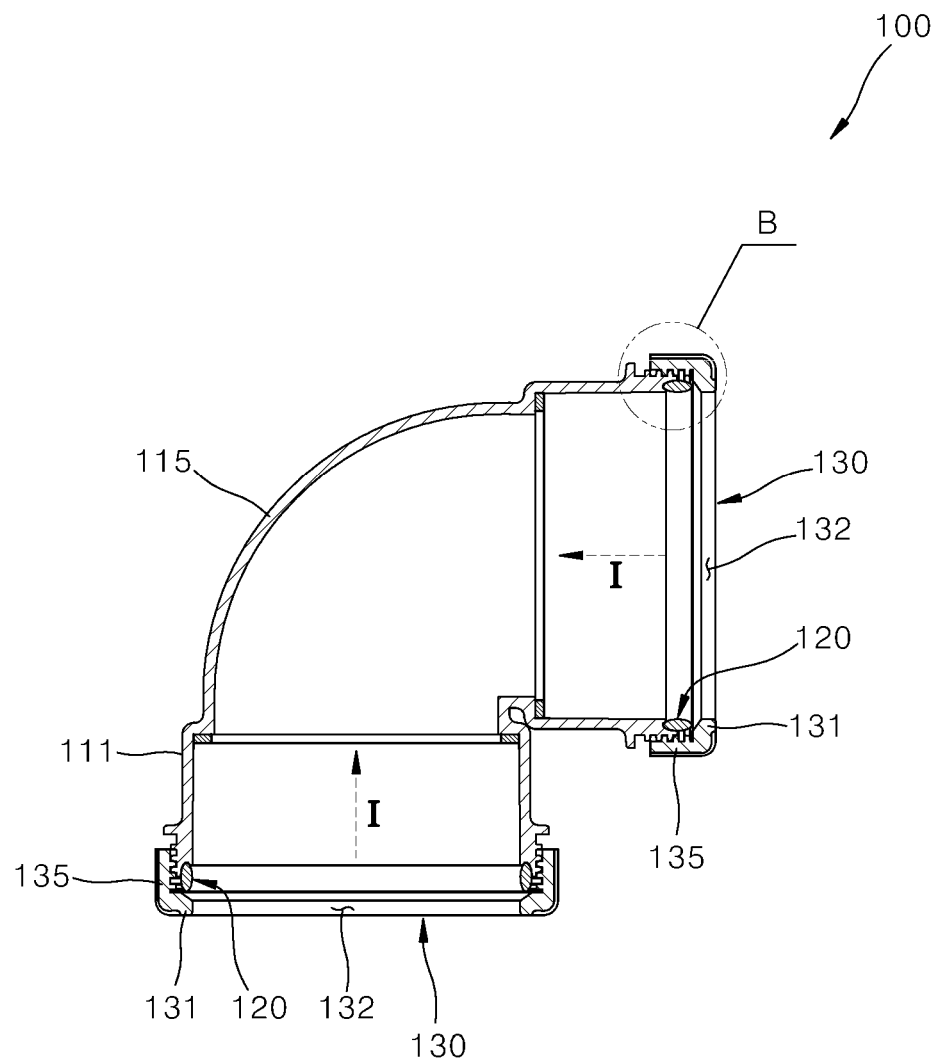
FIG. 3 is a cross-sectional view taken along line "A-A" of FIG. 1.
Figure 4:
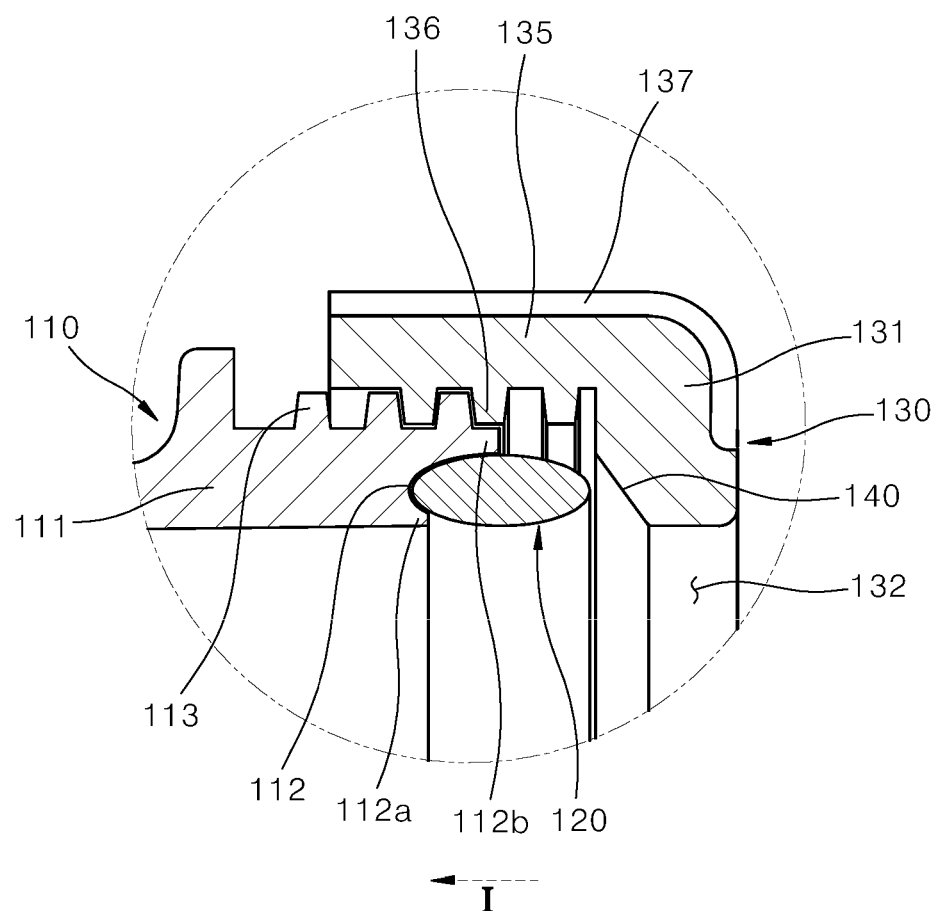
FIG. 4 is an enlarged view of a portion "B" of FIG. 3.

FIG. 1 is a perspective view illustrating a release state of a one-touch pipe connection device according to a first embodiment of the present disclosure. FIG. 2 is an exploded perspective view of a partial configuration of the one-touch pipe connection device of FIG. 1. FIG. 3 is a cross-sectional view taken along line "A-A" of FIG. 1. FIG. 4 is an enlarged view of a portion "B" of FIG. 3.

Referring to FIGS. 1 to 4, a one-touch pipe connection device 100 according to a first embodiment of the present disclosure may include a socket main body portion 110, a sealing portion, and a cap portion 130.

The socket main body portion 110 forms a main body of the one-touch pipe connection device 100 of the present embodiment, and may include a plurality of pipe fitting portions 111 and a pipe connection portion 115.

Each of the pipe fitting portions 111 is connected to any one of pipes 10 to be connected. The pipe fitting portions 111 each are formed to have a pipe shape similar to the shape of the pipe 10 to be connected, and has an inner diameter corresponding to an outer diameter of the pipe 10 to be connected. The pipe 10 to be connected is connected to one of the pipe fitting portions 111 as one side of the pipe 10 to be connected in a lengthwise direction is inserted in one of the pipe fitting portions 111.

The pipe connection portion 115 corresponds to a portion connecting the pipe fitting portions 111. The pipe connection portion 115 is formed to be located between the pipe fitting portions 111. The pipe fitting portions 111 may be connected to each other via the pipe connection portion 115.

The socket main body portion 110 configured to include the pipe fitting portions 111 and the pipe connection portion 115 may have any one of a "┐" shape, a "——" shape, a "T" shape, and a "+" shape formed by the connection of the pipe fitting portions 111. In other words, the socket main body portion 110 may be provided in form of an elbow joint pipe in which two pipe fitting portions 111 are connected forming the "┐" shape, a straight type joint pipe in which two pipe fitting portions 111 are connected forming the "——" shape, a T-shaped joint pipe in which three pipe fitting portions 111 are connected forming the "T" shape, and a cross joint pipe in which four pipe fitting portions 111 are connected forming the "+" shape. Additionally, various types of joint pipes may be provided, for example, a Y type joint pipe in which three pipe fitting portions 111 are connected forming a "Y" shape, or a joint pipe in which the pipe fitting portions 111 having different diameters are connected to each other. In the present embodiment, a case in which the socket main body portion 110 is an elbow joint pipe in which two pipe fitting portions 111 are connected forming the "┐" shape is described as an example.

Figure 9:
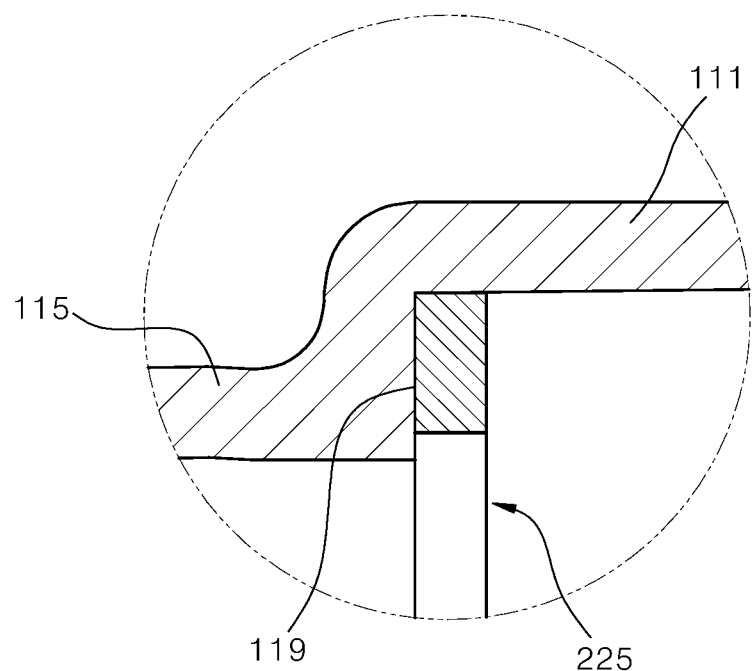
FIG. 9 is an enlarged view of a portion "E" of FIG. 7.

The pipe connection portion 115 may have an inner diameter smaller than the inner diameter of each of the pipe fitting portions 111. In other words, the pipe connection portion 115 is formed to have a diameter smaller than that of the pipe fitting portions 111. A support step portion 119 for connecting the pipe connection portion 115 and the pipe fitting portions 111 with a step therebetween may be formed between the pipe connection portion 115 and each of the pipe fitting portions 111, as illustrated in FIG. 9.

The support step portion 119 is in forma of a step protruding from an inner circumferential surface of one of the pipe fitting portions 111 toward a center thereof. The support step portion 119 has an outer diameter corresponding to the inner diameter of the pipe fitting portion 111, and includes a flat surface having a ring shape having an inner diameter corresponding to the inner diameter of the pipe connection portion 115. An end portion of the one side of the pipe 10 to be connected inserted in the pipe fitting portion 111, in the lengthwise direction, interferes with the support step portion 119, thereby restricting a position of the pipe 10 to be connected in an insertion direction I.

A guide support groove portion 112 is formed at an entrance side of the pipe fitting portion 111 to be concave from an end portion at the entrance side of the pipe fitting portion 111 toward the inside of the pipe fitting portion 111 in the lengthwise direction. In the present embodiment, the guide support groove portion 112 is formed, for example, in a "V" shaped groove.

The guide support groove portion 112 is formed between an inner circumferential surface and an outer circumferential surface of the pipe fitting portion 111. An inner support wall 112a is formed at one side of the guide support groove portion 112, that is, a side adjacent to the inner circumferential surface of the pipe fitting portion 111. An outer support wall 112b is formed at the other side of the guide support groove portion 112, that is, a side adjacent to the outer circumferential surface of the pipe fitting portion 111.

The sealing portion is provided between the socket main body portion 110 and the pipe 10 to be connected and forming a seal between the pipe 10 to be connected inserted in the pipe fitting portion 111 and the socket main body portion 110. According to the present embodiment, the sealing portion may include a first sealing member 120.

The first sealing member 120 is provided at the entrance side of the pipe fitting portion 111 that is open and coupled to the cap portion 130. The first sealing member 120 has a ring shape having an inner diameter equal to or greater than the outer diameter of the pipe 10 to be connected, and may be provided in a ring shape, for example, an O-ring shape, that is elastically deformable and has a certain length extending in the insertion direction I.

In an embodiment of the present disclosure, the first sealing member 120 may have a ring shape having an inner diameter equal to or greater than the outer diameter of the pipe 10 to be connected, have an oval shape in which a major axis is formed along the insertion direction I of the pipe 10 to be connected, and have an elastically deformable ring, for example, an O-ring shape.

Figure 15:
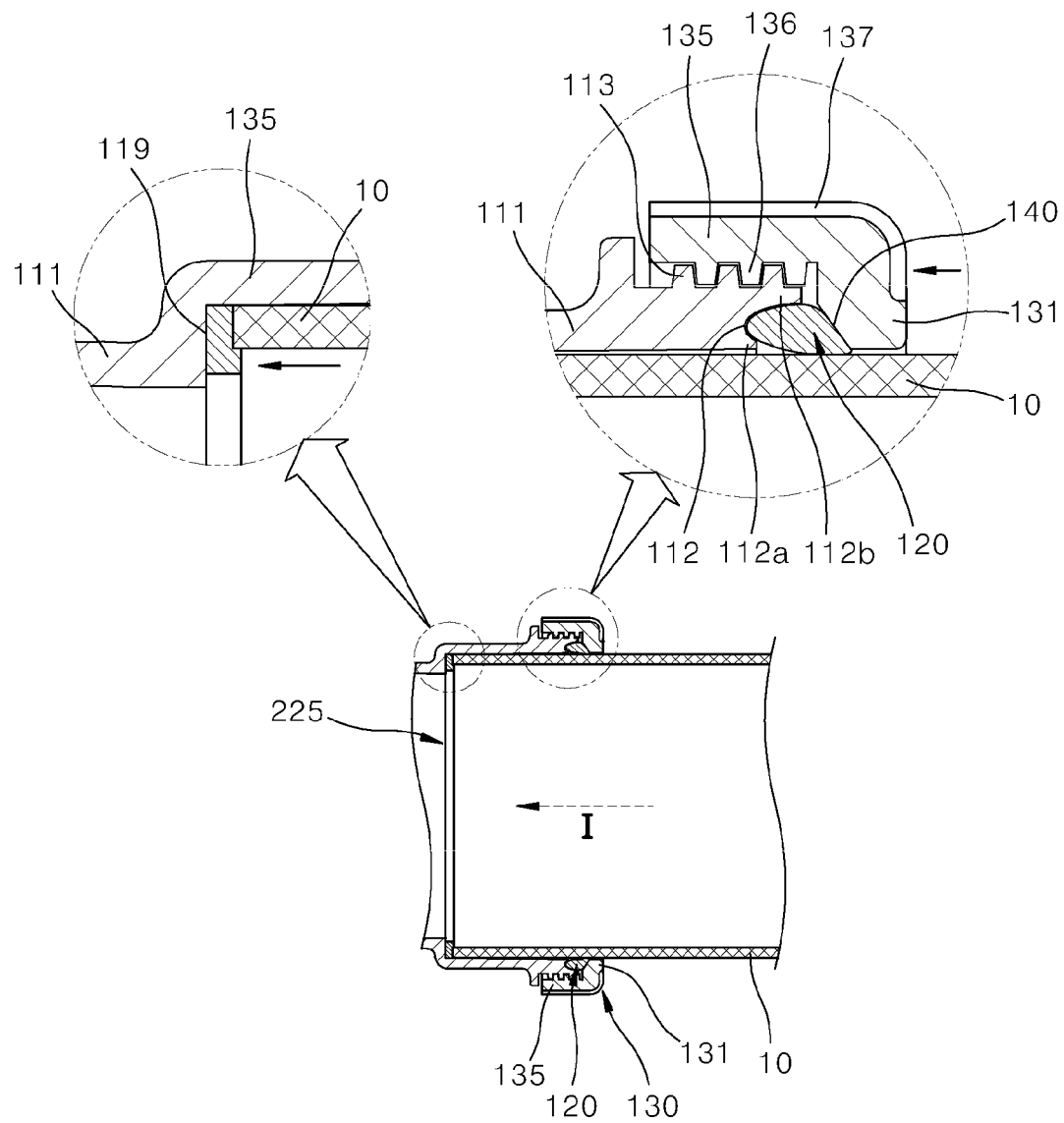
FIG. 15 is a cross-sectional view illustrating a lock state of the one-touch pipe connection device of FIG. 14.

In an embodiment of the present disclosure, the first sealing member 120 may easily have flexural deformation in a direction toward the pipe 10 to be connected by a pressure guide portion 140 as illustrated in FIG. 15, as the cap portion 130 rotates to be coupled to the pipe fitting portion 111. Due to the flexural deformation, an end portion of other side of the first sealing member 120 in a lengthwise direction may be inserted, in a wedge shape, in a space formed by an outer circumferential surface of the pipe 10 to be connected and an inclined surface of the pressure guide portion 140.

Furthermore, the first sealing member 120 may simultaneously have an oval sectional shape and a ring shape having an inner diameter equal to or greater than the outer diameter of the pipe to be connected. According to the above structure, as illustrated in FIG. 15, a phenomenon in which the first sealing member is pushed or caught by an end portion of the pipe 10 to be connected in a direction toward the pipe fitting portion 111 when the pipe 10 to be connected is inserted in the pipe fitting portion 111 may be remarkably reduced.

When an inner diameter of the first sealing member 120 is set to be equal to or greater than that of the pipe to be connected and simultaneously the section of the first sealing member 120 is formed to have an oval shape, when the pipe 10 to be connected contacts the first sealing member 120 as the pipe 10 to be connected is inserted in the pipe fitting portion 111, the phenomenon in which the first sealing member is pushed or caught by the end portion of the pipe 10 to be connected as the first sealing member 120 is pushed outwardly from the pipe 10 to be connected may be remarkably reduced. This is because, when the pipe 10 to be connected is inserted in the pipe fitting portion 111, the end portion of the pipe 10 to be connected contacts first an inner side of the end portion of the other side of the first sealing member 120 having an oval sectional shape, rather than the end portion of the other side of the first sealing member 120 in the lengthwise direction.

Actually, a phenomenon that occurs most frequently when coupling a pipe connection device and a pipe is a pushing or catching phenomenon. Accordingly, it is the most important subject to solve in the art to which the present disclosure pertains. Due to the pushing or catching phenomenon of a sealing member, construction workers need to put in and pull out a pipe several times in a process of coupling a connection device and the pipe, and after the pipe is inserted, if a construction worker fails to identify a state of the sealing member being pushed, a phenomenon that a fluid leaks from a pipe connection portion after construction is completed may frequently occur.

However, according to the structures of the first sealing member 120 described above and the pressure guide portion 140 described below, the remarkable reduction of the pushing or catching phenomenon of the first sealing member 120 have been proved through several experiments and actual construction examples. Accordingly, manpower and time consumed for pipe construction may be remarkably reduced, and after the pipe construction, the leakage of a fluid flowing in a pipe from a connection portion due to the pushing or catching phenomenon may be fundamentally prevented.

The first sealing member 120 is provided at the entrance side of the pipe fitting portion 111 by fitting into the guide support groove portion 112 such that an inner circumferential surface of the first sealing member 120 is supported by the inner support wall 112*a* and an outer circumferential surface of the first sealing member 120 is supported by the outer support wall 112*b*, and is fixed at the entrance side of the pipe fitting portion 111. One side of the first sealing member 120 in the lengthwise direction is supported by the guide support groove portion 112. When the cap portion 130 is coupled to the pipe fitting portion 111, the other end portion of the first sealing member 120 in the lengthwise direction contacts the pressure guide portion 140 that is formed on an inner side of the cap portion 130. The first sealing member 120 forms a seal between the outer circumferential surface of the pipe 10 to be connected inserted in the pipe fitting portion 111 and the inner circumferential surface of the pipe fitting portion 111.

The cap portion 130 is separately provided at the entrance side of the pipe fitting portion 111 that is open. A through hole 132 for passing the pipe 10 to be connected inserted in the pipe fitting portion 111 is formed in the cap portion 130. The cap portion 130 may be coupled to the pipe fitting portion 111 while moving along the insertion direction I of the pipe 10 to be connected inserted in the pipe fitting portion 111. As the cap portion 130 is coupled to the pipe fitting portion 111, the cap portion 130 presses the sealing portion in a direction to closely contact the pipe 10 to be connected. According to the present embodiment, the cap portion 130 may include a ring-shaped portion 131 and a skirt portion 135.

The ring-shaped portion 131 has a ring shape, in which the through hole 132 is formed inside. When the cap portion 130 is coupled to the pipe fitting portion 111, an inner surface of the ring-shaped portion 131 faces the inside of the pipe fitting portion 111, and an outer surface of the ring-shaped portion 131 faces outside the pipe fitting portion 111 and the cap portion 130. The skirt portion 135 is formed by extending from an outer edge of the ring-shaped portion 131 in the insertion direction I. The skirt portion 135 is formed such that an inner circumferential surface of the skirt portion 135 is located outside the through hole 132 along a diametric direction of the ring-shaped portion 131.

Furthermore, the pressure guide portion 140 is formed on the inner side of the cap portion 130 to obliquely protrude between an inner circumferential surface of the ring-shaped portion 131 and the inner circumferential surface of the skirt portion 135 to obliquely connect the inner circumferential surface of the ring-shaped portion 131 where the through hole 132 is formed and the inner circumferential surface of the skirt portion 135.

The pressure guide portion 140 has an inclined surface that is formed to protrude relatively less in a direction toward the center of the through hole 132 as it is closer to the inner circumferential surface of the skirt portion 135, and to protrude relatively further in the direction toward the center of the through hole 132 as it is closer to the inner circumferential surface of the ring-shaped portion 131.

In other words, the pressure guide portion 140 has an inclined surface that is formed to protrude relatively further from the inner surface of the ring-shaped portion 131 toward the side of the insertion direction I as it is closer to the inner circumferential surface of the skirt portion 135, and to protrude relatively less from the inner surface of the ring-shaped portion 131 toward the side of the insertion direction I as it is closer to the through hole 132.

The pressure guide portion 140 is moved in a direction closer to the guide support groove portion 112 according to the movement of the cap portion 130 in the insertion direction to press the other side of the first sealing member 120 in the lengthwise direction in the insertion direction, thereby inducing the flexural deformation of the first sealing member 120. FIG. 15 illustrates a process of the flexural deformation of the first sealing member 120 by the pressure guide portion 140.

In the present embodiment, the pipe fitting portion 111 and the cap portion 130 are coupled to each other in a screw coupling manner. In detail, a first screw coupling portion 113 is formed on the outer circumferential surface at the entrance side of the pipe fitting portion 111, and a second screw coupling portion 137 to be screw coupled to the first screw coupling portion 113 is formed on the inner circumferential surface of the skirt portion 135. The cap portion 130 may be coupled to the pipe fitting portion 111 while moving in the insertion direction I by the screw coupling between the first screw coupling portion 113 and the second screw coupling portion 137.

In this state, the cap portion 130 is moved in the insertion direction I by the screw coupling between the first screw coupling portion 113 and the second screw coupling portion 137, and coupled to the pipe fitting portion 111 by moving in a direction in which a distance between the pressure guide portion 140 and the guide support groove portion 112 decreases. In other words, as the coupling between the cap portion 130 and the pipe fitting portion 111 progresses, the distance between the pressure guide portion 140 and the guide support groove portion 112 decreases, and decoupling between the cap portion 130 and the pipe fitting portion 111 progresses, the distance between the pressure guide portion 140 and the guide support groove portion 112 increases.

In addition, a plurality of grip grooves 137 may be formed on an outer side of the cap portion 130, in detail, an outer side of the skirt portion 135. The grip grooves 137 are arranged on the outer side of the cap portion 130 along a circumferential direction of the cap portion 130 to be spaced apart from each other at a certain interval. Each of the grip grooves 137 is formed in a concave groove shape in the outer circumferential surface of the skirt portion 135 to be open toward the outer side of the skirt portion 135 and the ring-shaped portion 131.

The grip grooves 137 configured as above may prevent a slip of a worker's hand holding the cap portion 130 when the worker rotates the cap portion 130 by holding the same to couple the cap portion 130 to the pipe fitting portion 111 or release the cap portion 130 coupled to the pipe fitting portion 111. In this state, worker's fingers may be caught by the grip grooves 137 through portions of the grip grooves 137 open toward the outer side of the skirt portion 135, and a palm portion of the worker's hand may be caught by portions of the grip groove 137 open toward the ring-shaped portion 131. In other words, a grip force of the cap portion 130 may be improved in a manner that both the fingers and palm of a worker are caught by the grip groove 137. Accordingly, a work of coupling the cap portion 130 to the pipe fitting portion 111 or releasing the cap portion 130 coupled to the pipe fitting portion 111 may be performed more easily and quickly.

The one-touch pipe connection device configured as above is merely an embodiment of the present disclosure, and there may be a variety of embodiments to replace the device.

Figure 5:
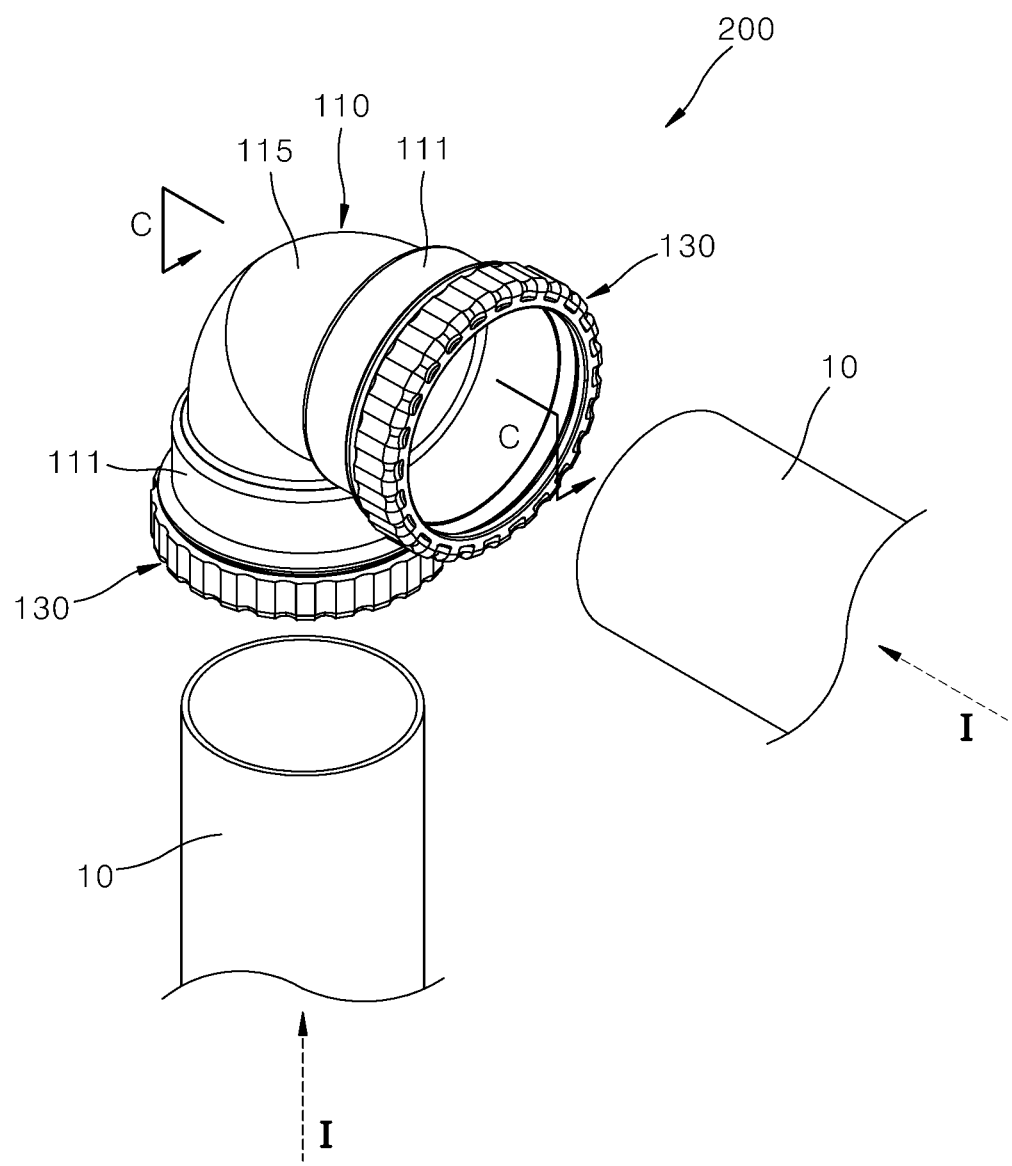
FIG. 5 is a perspective view illustrating a release state of a one-touch pipe connection device according to a second embodiment of the present disclosure.
Figure 6:
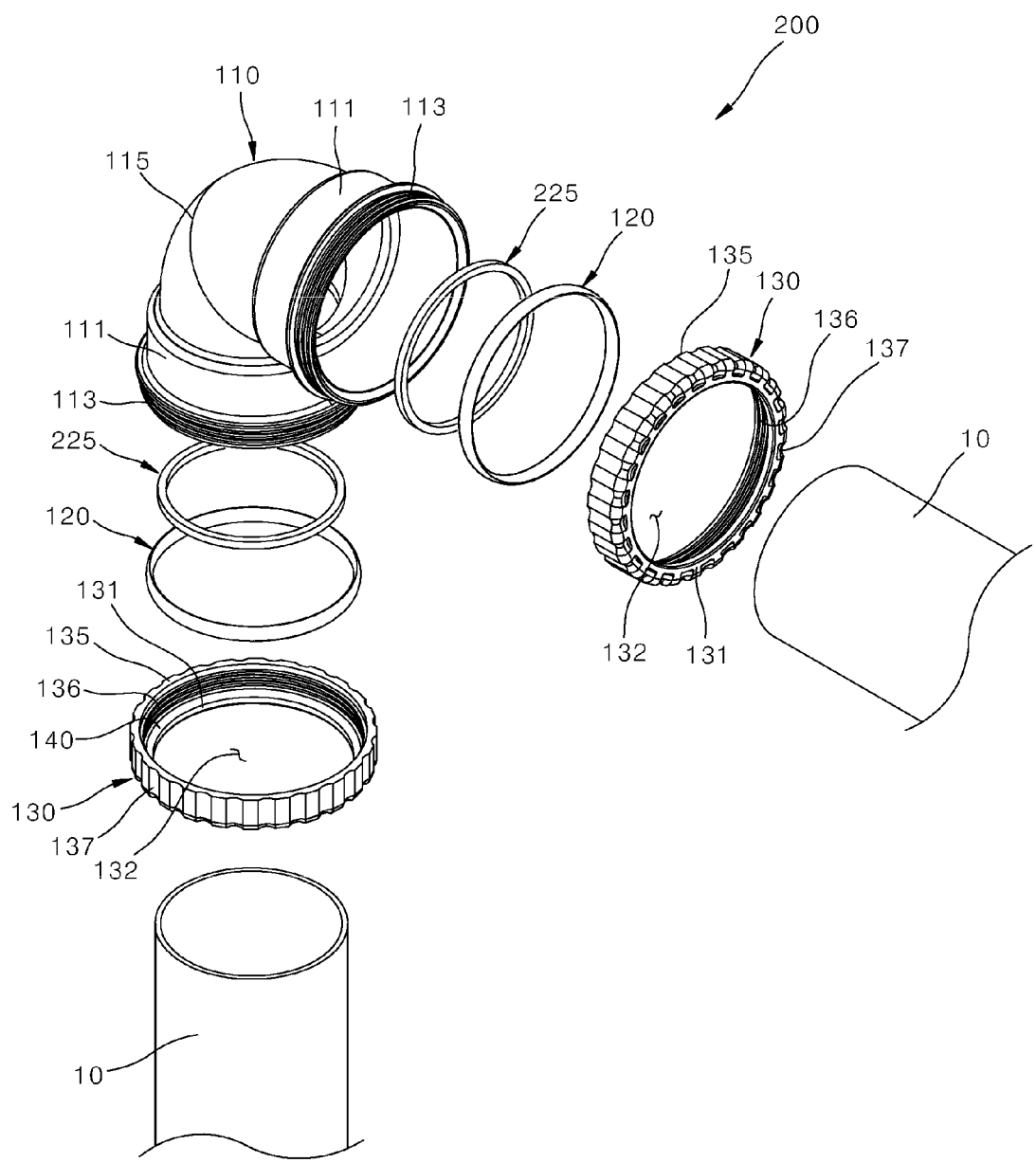
FIG. 6 is an exploded perspective view of a partial configuration of the one-touch pipe connection device of FIG. 5.
Figure 7:
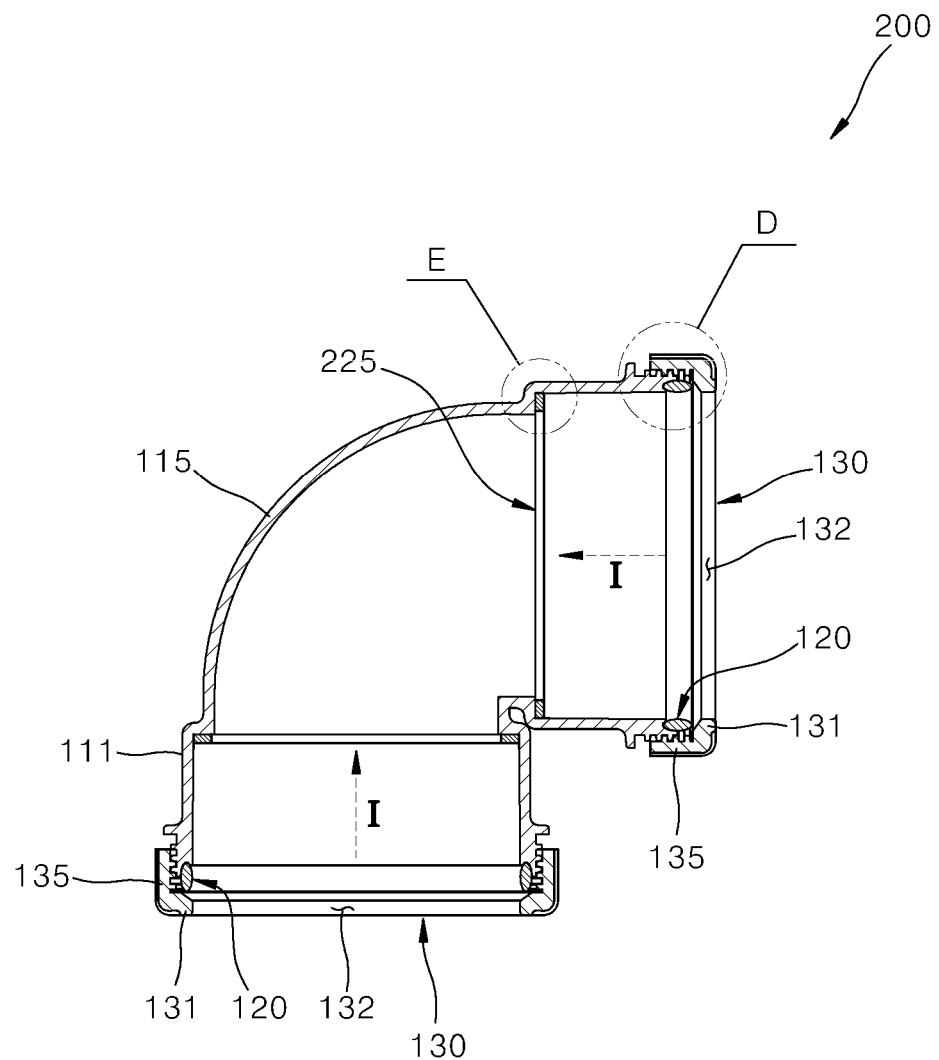
FIG. 7 is a cross-sectional view taken along line "C-C" of FIG. 5.
Figure 8:
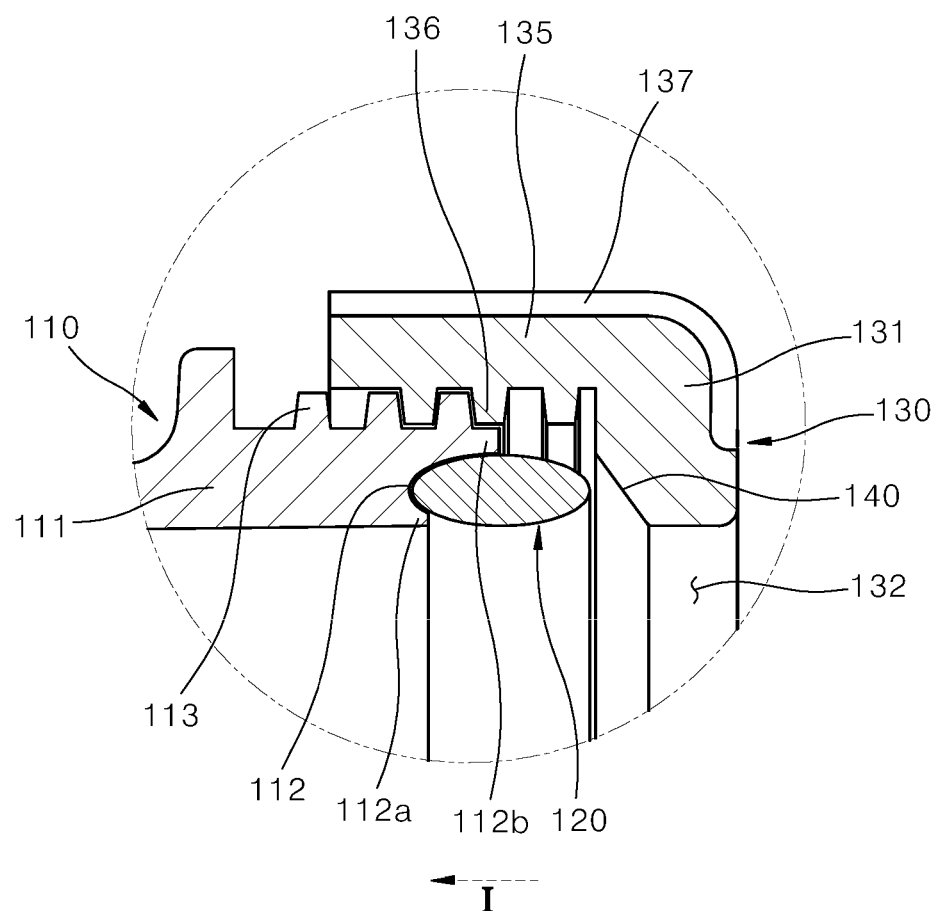
FIG. 8 is an enlarged view of a portion "D" of FIG. 7.
Figure 10:
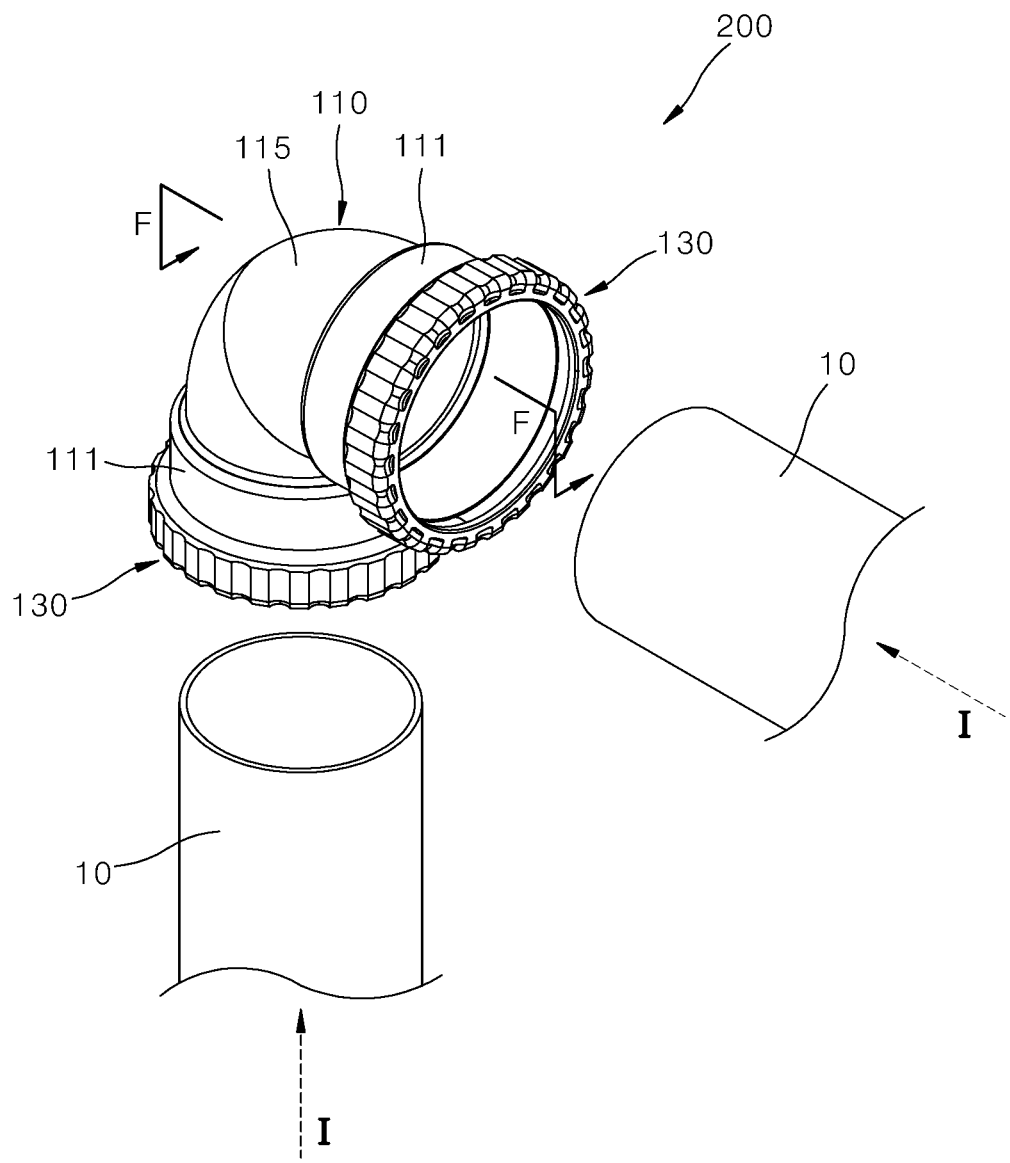
FIG. 10 is a perspective view of a lock state of the one-touch pipe connection device according to the second embodiment of the present disclosure.
Figure 11:
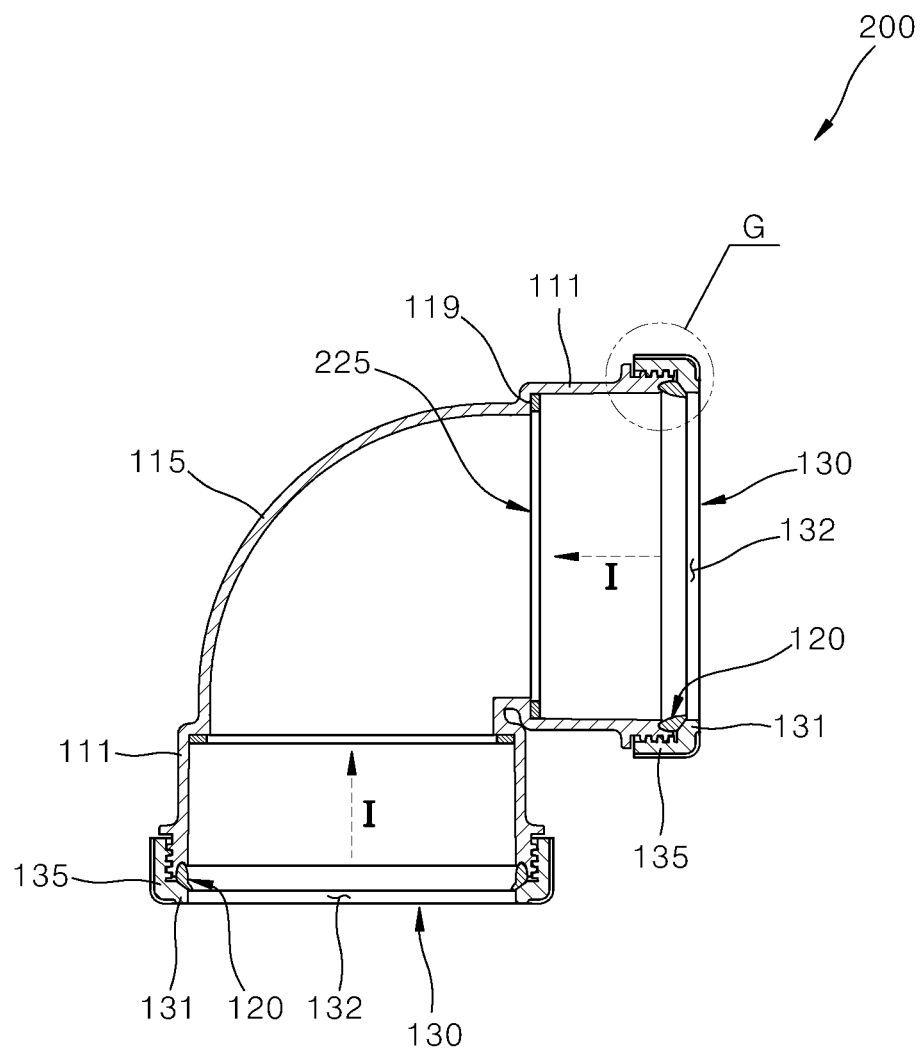
FIG. 11 is a cross-sectional view taken along line "F-F" of FIG. 10.
Figure 12:
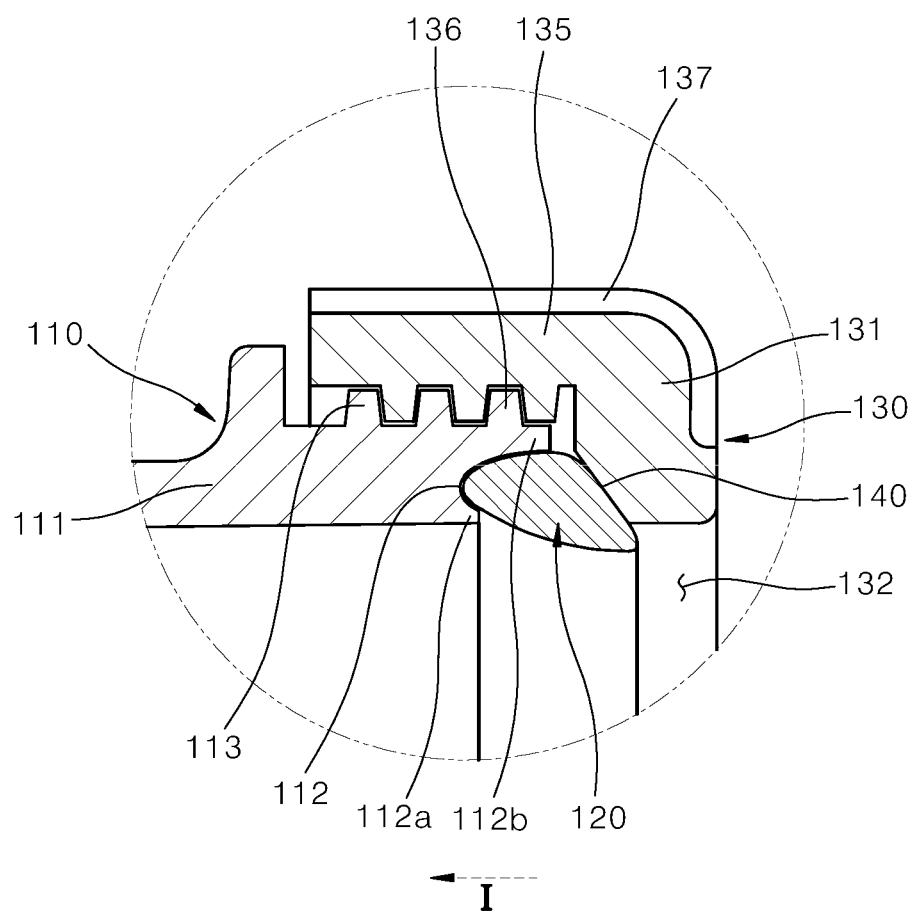
FIG. 12 is an enlarged view of a portion "G" of FIG. 10.
Figure 13:
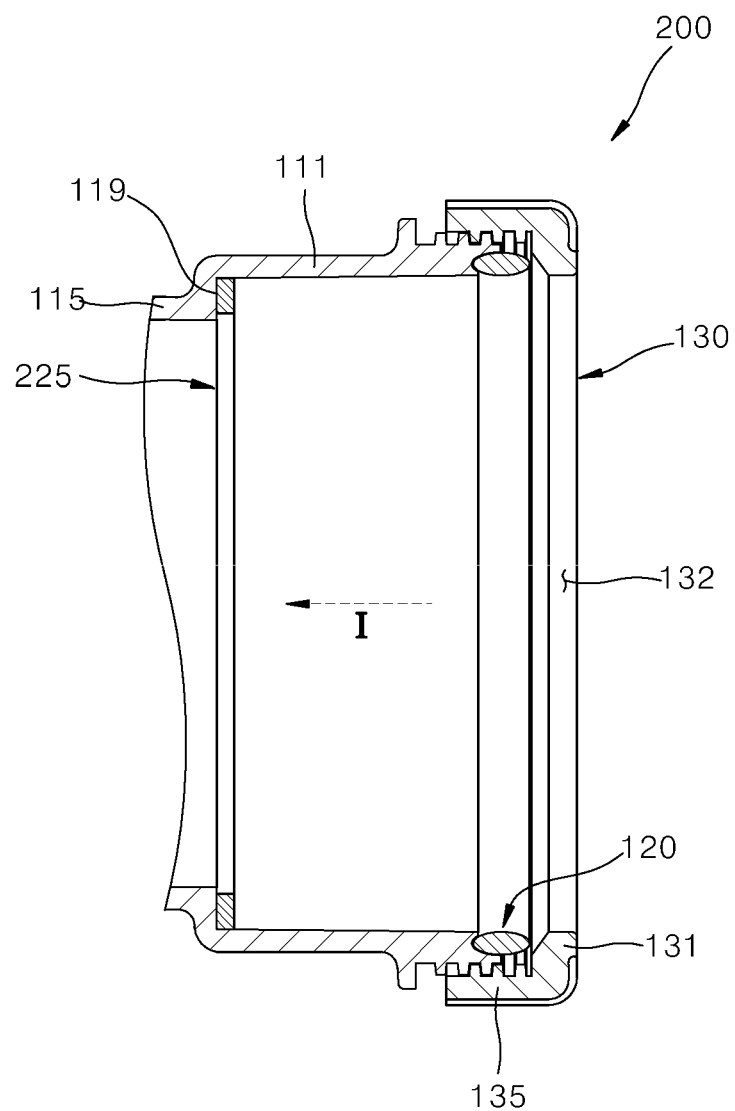
FIG. 13 is a cross-sectional view illustrating a release state of the one-touch pipe connection device according to the second embodiment of the present disclosure.
Figure 14:
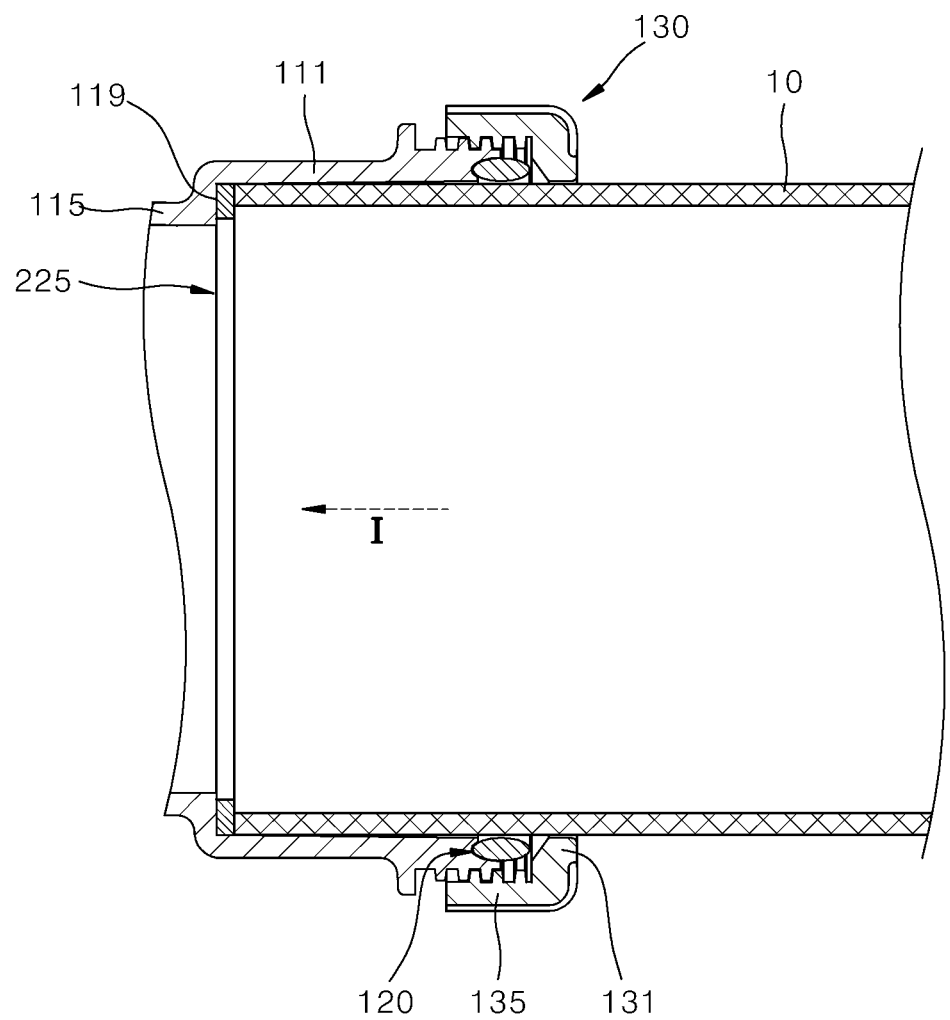
FIG. 14 is a cross-sectional view illustrating a state in which a pipe to be connected is inserted in the one-touch pipe connection device of FIG. 13.
Figure 16:
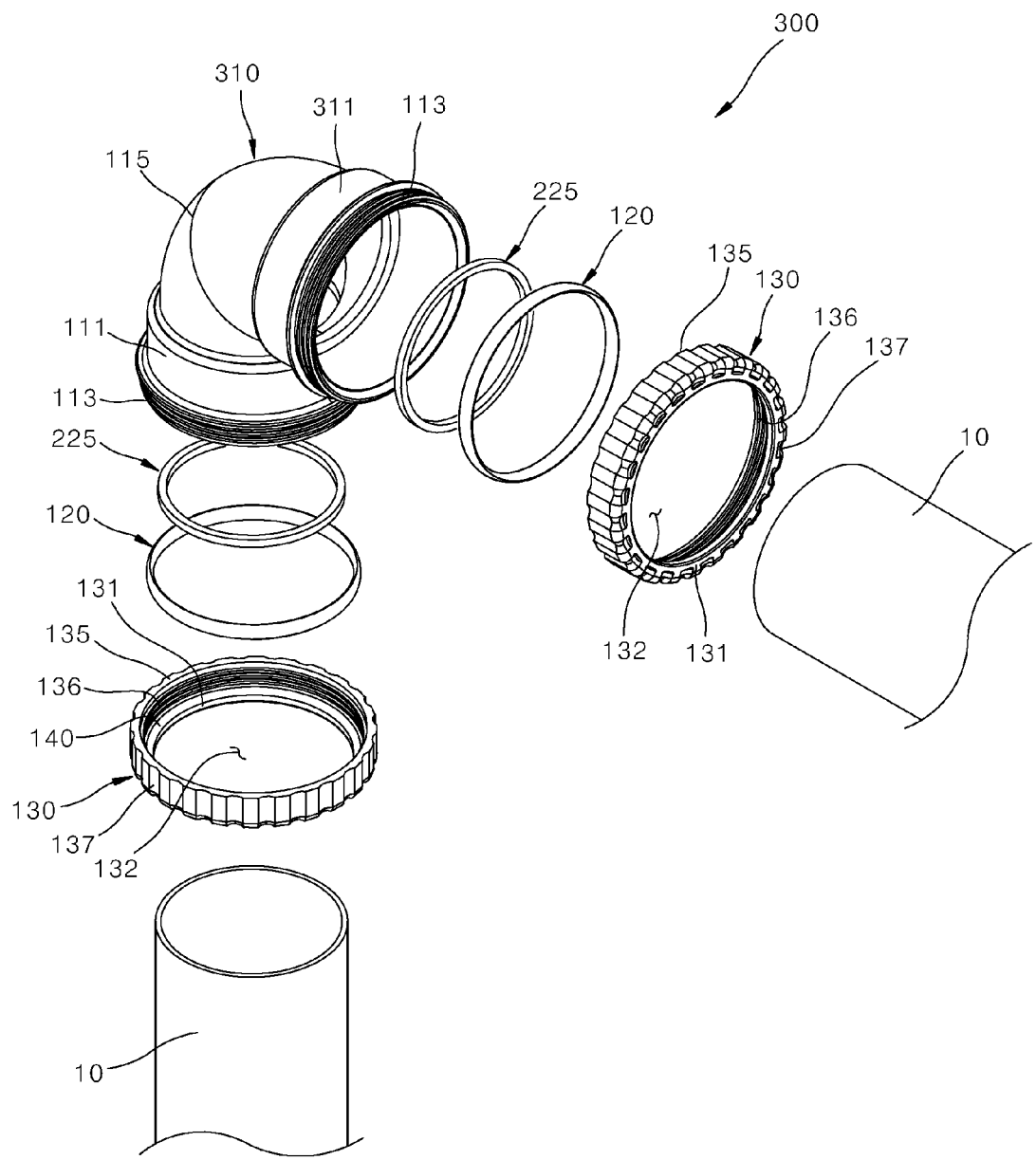
FIG. 16 is an exploded perspective view of a partial configuration of a one-touch pipe connection device according to a third embodiment of the present disclosure.
Figure 17:
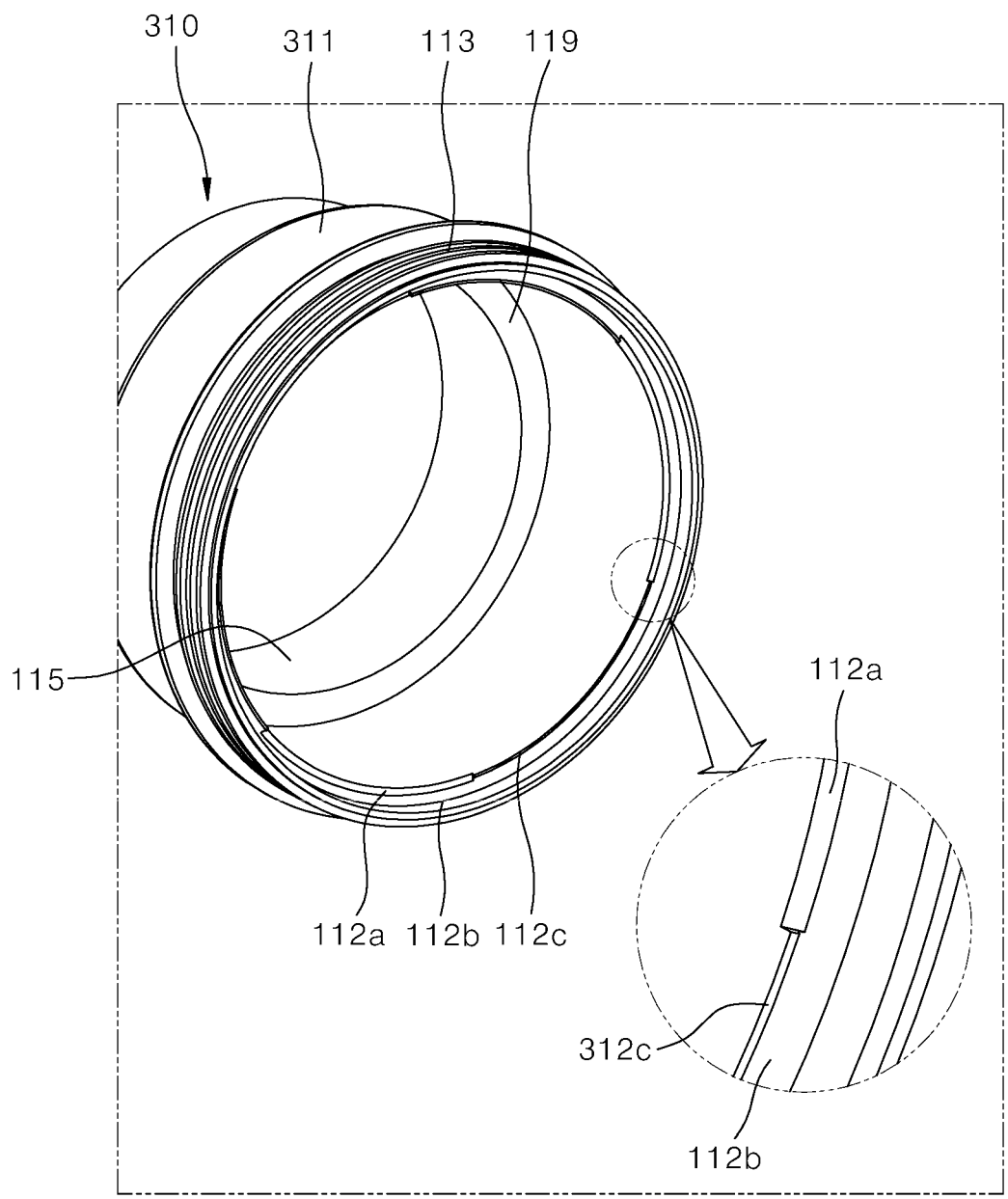
FIG. 17 is an enlarged perspective view of an entrance side of a pipe fitting portion of FIG. 16.

FIG. 5 is a perspective view illustrating a release state of a one-touch pipe connection device according to a second embodiment of the present disclosure. FIG. 6 is an exploded perspective view of a partial configuration of the one-touch pipe connection device of FIG. 5. FIG. 7 is a cross-sectional view taken along line "C-C" of FIG. 5. FIG. 8 is an enlarged view of a portion "D" of FIG. 7. FIG. 9 is an enlarged view of a portion "E" of FIG. 7. FIG. 10 is a perspective view of a lock state of the one-touch pipe connection device according to the second embodiment of the present disclosure. FIG. 11 is a cross-sectional view taken along line "F-F" of FIG. 10. FIG. 12 is an enlarged view of a portion "G" of FIG. 10. FIG. 13 is a cross-sectional view illustrating a release state of the one-touch pipe connection device according to the second embodiment of the present disclosure. FIG. 14 is a cross-sectional view illustrating a state in which a pipe to be connected is inserted in the one-touch pipe connection device of FIG. 13. FIG. 15 is a cross-sectional view illustrating a lock state of the one-touch pipe connection device of FIG. 14. FIG. 16 is an exploded perspective view of a partial configuration of a one-touch pipe connection device according to a third embodiment of the present disclosure. FIG. 17 is an enlarged perspective view of an entrance side of a pipe fitting portion of FIG. 16.

Other embodiments of the present disclosure are described below in detail with reference to FIGS. 5 to 17.

Since like reference numeral denotes like element having the same function throughout the drawings, redundant descriptions thereof are omitted.

First, referring to FIGS. 5 to 9, in a one-touch pipe connection device 200 according to a second embodiment of the present disclosure, a sealing portion may include the first sealing member 120 and the second sealing member 225.

The first sealing member 120 is provided at the entrance side of the pipe fitting portion 111 that is open and coupled to the cap portion 130. The first sealing member 120 has a ring shape having an inner diameter equal to or greater than the outer diameter of the pipe 10 to be connected, and may be provided in a ring shape, for example, an O-ring shape, that is elastically deformable and has a certain length extending in the insertion direction I.

In an embodiment of the present disclosure, the first sealing member 120 may have a ring shape having an inner diameter equal to or greater than the outer diameter of the pipe 10 to be connected, have an oval shape in which a major axis is formed along the insertion direction I of the pipe 10 to be connected, and have an elastically deformable ring, for example, an O-ring shape.

In an embodiment of the present disclosure, the first sealing member 120 may easily have flexural deformation in a direction toward the pipe 10 to be connected by a pressure guide portion 140, as illustrated in FIG. 15, as the cap portion 130 rotates to be coupled to the pipe fitting portion 111. Due to the flexural deformation, the end portion of the other side of the first sealing member 120 in a lengthwise direction may be inserted, in a wedge shape, in a space formed by an outer circumferential surface of the pipe 10 to be connected and an inclined surface of the pressure guide portion 140.

Furthermore, the first sealing member 120 may simultaneously have an oval sectional shape and a ring shape having an inner diameter equal to or greater than the outer diameter of the pipe to be connected. According to the above structure, as illustrated in FIG. 15, a phenomenon in which the first sealing member is pushed or caught by an end portion of the pipe 10 to be connected in a direction toward the pipe fitting portion 111 when the pipe 10 to be connected is inserted in the pipe fitting portion 111 may be remarkably reduced.

When an inner diameter of the first sealing member 120 is set to be equal to or greater than that of the pipe to be connected and simultaneously the section of the first sealing member 120 is formed to have an oval shape, when the pipe 10 to be connected contacts the first sealing member 120 as the pipe 10 to be connected is inserted in the pipe fitting portion 111, the phenomenon in which the first sealing member is pushed or caught by the end portion of the pipe 10 to be connected as the first sealing member 120 is pushed outwardly from the pipe 10 to be connected may be remarkably reduced. This is because, when the pipe 10 to be connected is inserted in the pipe fitting portion 111, the end portion of the pipe 10 to be connected contacts first an inner side of the end portion of the other side of the first sealing member 120 having an oval sectional shape, rather than the end portion of the other side of the first sealing member 120 in the lengthwise direction.

Actually, a phenomenon that occurs most frequently when coupling a pipe connection device and a pipe is a pushing or catching phenomenon. Accordingly, it is the most important subject to solve in the art to which the present disclosure pertains. Due to the pushing or catching phenomenon of a sealing member, construction workers need to put in and pull out a pipe several times in a process of coupling a connection device and the pipe, and after the pipe is inserted, if a construction worker fails to identify a state of the sealing member being pushed, a phenomenon that a fluid leaks from a pipe connection portion after construction is completed may frequently occur.

However, according to the structures of the first sealing member 120 described above and the pressure guide portion 140 described below, the remarkable reduction of the pushing or catching phenomenon of the first sealing member 120 have been proved through several experiments and actual construction examples. Accordingly, manpower and time consumed for pipe construction may be remarkably reduced, and after the pipe construction, the leakage of a fluid flowing in a pipe from a connection portion due to the pushing or catching phenomenon may be fundamentally prevented.

In an embodiment of the present disclosure, the first sealing member 120, as illustrated in FIG. 8, is placed on the guide support groove portion 112 having a corresponding shape in a surface of the one end portion of the one side of the first sealing member 120 in the lengthwise direction.

Referring to the drawings, the inner support wall 112a is formed at a side adjacent to the inner circumferential surface of the pipe fitting portion 111 of the guide support groove portion 112 having a shape corresponding to the surface of the one end portion of the one side of the first sealing member 120 in the lengthwise direction. The outer support wall 112b is formed at a side adjacent to the outer circumferential surface of the pipe fitting portion 111. As illustrated in FIG. 8, as the first sealing member 120 is placed on the guide support groove portion 112, each of the inner support wall 112a and the outer support wall 112b closely contacts the surface of the one end portion of the one side of the first sealing member 120 in the lengthwise direction.

According to the related art, there are two methods of connecting a pipe connection device and a pipe.

1) Inserting a sealing member or an O-ring around a pipe, and then inserting the pipe with the O-ring inserted therearound in a connection device.

2) Inserting a pipe in a connection device, inserting an O-ring around the pipe, and moving the O-ring in a direction toward the inside of a connection device to be inserted therein.

According to the above methods 1) and 2), when a construction worker connects a pipe to a connection device, a work of inserting an O-ring around the pipe is necessary. As such, when a construction worker directly inserts an O-ring around a pipe, a work time for connecting a pipe increases much, and locating the O-ring at an accurate position for securing watertight between the pipe and a connection device may not be guaranteed.

However, when a pipe to be connected is connected to the one-touch pipe connection device according to the present disclosure, the first sealing member 120 fits into the guide support groove portion 112 before inserting the pipe in the pipe connection device, and then the pipe to be connected is inserted in the pipe fitting portion. In other words, the one-touch pipe connection device according to the present disclosure is used, a construction worker does not need to directly insert the first sealing member 120 in the pipe to be connected.

A difference between the present disclosure and the related art is caused by a shape of the first sealing member 120 and a shape of the guide support groove portion 112 of the present disclosure. As described above, since the guide support groove portion 112 of the present disclosure has a shape corresponding to the surface of the one end portion of the one side of the first sealing member 120 in the lengthwise direction, when the first sealing member 120 fits into the guide support groove portion 112, each of the inner support wall 112a and the outer support wall 112b of the guide support groove portion 112 closely contacts the surface of the one end portion of the one side of the first sealing member 120 in the lengthwise direction. Accordingly, when the first sealing member 120 is fixed to the guide support groove portion 112 without a movement, and the pipe 10 to be connected is inserted, the first sealing member 120 may not be pushed or caught by the pipe 10 to be connected due to the above-described shape of the first sealing member 120.

The outer support wall 112b and the inner support wall 112a of the guide support groove portion 112 according to the present disclosure completely closely contact the surface of the one end portion of the one side of the first sealing member 120 in the lengthwise direction. Accordingly, a space between the first sealing member 120 and each of the outer support wall 112b and the inner support wall 112a, into which a fluid intrudes, may be completely removed.

The one-touch pipe connection device according to the present disclosure is mainly used to connect vertically installed pipes, for example, waste water pipes in a toilet or kitchen. When a flow rate of a fluid flowing in a waste water pipe that is vertically installed decreases, the fluid stays in a pipe connection portion and may intrude into the pipe connection portion. The fluid intruding into the pipe connection portion is sucked in a space between the pipe fitting portion and a sealing member due to a capillary phenomenon and leaks to the outside through the pipe connection device.

However, since the outer support wall 112b and the inner support wall 112a of the guide support groove portion 112 according to the present disclosure completely closely contact the surface of the one end portion of the one side of the first sealing member 120, a space where a fluid stays due to a capillary phenomenon is removed, and thus a probability of leakage may be remarkably reduced.

The first sealing member 120 is provided at the entrance side of the pipe fitting portion 111 by fitting into the guide support groove portion 112 such that an inner circumferential surface of the first sealing member 120 is supported by the inner support wall 112a and the outer circumferential surface of the first sealing member 120 is supported by the outer support wall 112b, and is fixed at the entrance side of the pipe fitting portion 111. The one side of the first sealing member 120 in the lengthwise direction is supported by the guide support groove portion 112. When the cap portion 130 is coupled to the pipe fitting portion 111, the other side of the first sealing member 120 in the lengthwise direction contacts the pressure guide portion 140 that is formed on the inner side of the cap portion 130. The first sealing member 120 forms a seal between the outer circumferential surface of the pipe 10 to be connected inserted in the pipe fitting portion 111 and the inner circumferential surface of the pipe fitting portion 111.

Furthermore, the pressure guide portion 140 is formed on the inner side of the cap portion 130 to obliquely protrude between the inner circumferential surface of the ring-shaped portion 131 and the inner circumferential surface of the skirt portion 135 to obliquely connect the inner circumferential surface of the ring-shaped portion 131 where the through hole 132 is formed and the inner circumferential surface of the skirt portion 135.

The pressure guide portion 140 has an inclined surface that is formed to protrude relatively less in a direction toward the center of the through hole 132 as it is closer to the inner circumferential surface of the skirt portion 135, and to protrude relatively further in the direction toward the center of the through hole 132 as it is closer to the inner circumferential surface of the ring-shaped portion 131.

In other words, the pressure guide portion 140 has an inclined surface that is formed to protrude relatively further from the inner surface of the ring-shaped portion 131 toward the side of the insertion direction I as it is closer to the inner circumferential surface of the skirt portion 135, and to protrude relatively less from the inner surface of the ring-shaped portion 131 toward the side of the insertion direction I as it is closer to the through hole 132.

The pressure guide portion 140 is moved in a direction closer to the guide support groove portion 112 according to the movement of the cap portion 130 in the insertion direction to press the other side of the first sealing member 120 in the lengthwise direction in the insertion direction, thereby inducing the flexural deformation of the first sealing member 120. FIG. 15 illustrates a process of the flexural deformation of the first sealing member 120 by the pressure guide portion 140.

As illustrated in FIG. 15, while sliding along the inclined surface formed on the pressure guide portion 140 that presses the other side of the first sealing member 120 in the lengthwise direction, the other side of the first sealing member 120 in the lengthwise direction has flexural deformation such that the end portion of the other side of the first sealing member 120 in the lengthwise direction protrudes in a direction toward the center of the ring-shaped portion 131. As such, as the end portion of the other side of the first sealing member 120 in the lengthwise direction is bent toward the insertion direction to protrude in the direction toward the center of the ring-shaped portion 131, one surface of the end portion of the other side of the first sealing member 120 in the lengthwise direction closely contacts the outer circumferential surface of the pipe 10 to be connected and other surface of the end portion of the other side of the first sealing member 120 in the lengthwise direction closely contacts the inclined surface formed on the pressure guide portion 140. Accordingly, the end portion of the other side of the first sealing member 120 in the lengthwise direction is inserted, in a wedge shape, in the space formed by the outer circumferential surface of the pipe 10 to be connected and the inclined surface formed on the pressure guide portion 140.

As described above, the one-touch pipe connection device according to the present disclosure is mainly used to connect vertically installed pipes, for example, waste water pipes in a toilet or kitchen. When a flow rate of a fluid flowing in a waste water pipe that is vertically installed decreases, the fluid stays in a pipe connection portion and may intrude into the pipe connection portion.

The sealing member (O-ring) provided around the pipe may be deformed by vibrations generated as the fluid falls or by other external factors, and an expansion and contraction phenomenon of the pipe and the pipe connection device due to a sharp change in the temperature (−10° C.-40° C.) of a place where the pipe is installed. As a gap between the pipe and the sealing member, or between the connection device and the sealing member, gets wider due to the deformation of the sealing member, a probability of leakage of the fluid staying in the pipe connection portion may be further increased.

However, according to the present disclosure, as illustrated in FIG. 15, as the end portion of the other side of the first sealing member 120 in the lengthwise direction has flexural deformation by the pressure guide portion 140, and the end portion of the other side of the first sealing member 120 in the lengthwise direction is inserted, in a wedge shape, in the space formed by the outer circumferential surface of the pipe 10 to be connected and the inclined surface formed on the pressure guide portion 140, a probability of leakage of the fluid between the cap portion 130 and the pipe 10 to be connected may be remarkably reduced.

According to the present embodiment, the cap portion 130, as illustrated in FIGS. 10 to 12, is coupled to the pipe fitting portion 111 while moving in the insertion direction I by the screw coupling between the first screw coupling portion 113 and the second screw coupling portion 137.

In this state, the cap portion 130 is moved in the insertion direction I by the screw coupling between the first screw coupling portion 113 and the second screw coupling portion 137, and coupled to the pipe fitting portion 111 by moving in a direction in which a distance between the pressure guide portion 140 and the guide support groove portion 112 decreases.

In other words, the pressure guide portion 140 is moved in a direction to be closer to the guide support groove portion 112 by the movement of the cap portion 130 moving in the insertion direction I and presses the other side of the first sealing member 120 in the lengthwise direction, thereby inducing the flexural deformation of the first sealing member 120.

As the other side of the first sealing member 120 in the lengthwise direction pressed by the pressure guide portion 140 as above has flexural deformation while sliding along the inclined surface formed on the pressure guide portion 140 that presses the other side of the first sealing member 120 in the lengthwise direction, the end portion of the other side of the first sealing member 120 in the lengthwise direction is bent toward the side of the insertion direction I and deformed to protrude in the direction toward the center of the ring-shaped portion 131.

The second sealing member 225 is provided in form of an elastically deformable ring, for example, in an O-ring shape, includes a flat surface having a ring shape corresponding to a flat surface of the ring shape of the support step portion 119, and is located between the support step portion 119 and the pipe 10 to be connected. As the second sealing member 225 is provided such that one side surface of the second sealing member 225 closely contacts the support step portion 119 between the support step portion 119 and the pipe 10 to be connected and the other side surface thereof closely contact the end portion of the one side of the pipe 10 to be connected in the lengthwise direction, the second sealing member 225 forms a seal between the socket main body portion 110 and the end portion of the one side of the pipe 10 to be connected in the lengthwise direction.

In other words, according to the present disclosure, due to a sealing operation of the first sealing member 120 performed between at the entrance side of the pipe fitting portion 111 and a sealing operation of the second sealing member 225 performed inside the pipe fitting portion 111, sealing between the one-touch pipe connection device 200 and the pipe 10 to be connected that is connected thereto is performed at two positions, which is described below in detail.

The one-touch pipe connection device 200 of FIGS. 3 and 13 is in a release state in which the coupling between the pipe fitting portion 111 and the cap portion 130 is not completed. The release state of the one-touch pipe connection device 200 means a state in which the cap portion 130 is slightly released from the pipe fitting portion 111 such that the pipe 10 to be connected may be inserted in the pipe fitting portion 111 or the pipe 10 to be connected may be pulled out from the pipe fitting portion 111. In this state, the cap portion 130 is loosely placed on an end portion of the entrance side of the pipe fitting portion 111 so as not to be completely separated from the pipe fitting portion 111 while maintaining the coupling to the pipe fitting portion 111.

In the above release state of the one-touch pipe connection device 200, as illustrated in FIG. 14, while the coupling between the pipe fitting portion 111 and the cap portion 130 is maintained, the pipe 10 to be connected may be inserted in the pipe fitting portion 111, or contrarily the pipe 10 to be connected inserted in the pipe fitting portion 111 may be pulled out from the pipe fitting portion 111.

In other words, as the pipe 10 to be connected is inserted in the pipe fitting portion 111 by passing through the cap portion 130 via the through hole 132 formed in the cap portion 130, the pipe 10 to be connected may be connected to the pipe fitting portion 111, that is, the one-touch pipe connection device 200. In this state, since the first sealing member 120 provided at the entrance side of the pipe fitting portion 111 has the inner diameter equal to or greater than the outer diameter of the pipe 10 to be connected, the pipe 10 to be connected may be inserted in the pipe fitting portion 111 by passing through the cap portion 130 without particular difficulty. Furthermore, since the inner support wall 112a formed at a side of the inner circumferential surface of the pipe fitting portion 111 restricts the position of the first sealing member 120 at the side of the inner circumferential surface, the pipe 10 to be connected may be inserted in the pipe fitting portion 111 without generating friction between in the pipe 10 to be connected and the first sealing member 120. In other words, the pipe 10 to be connected may be easily and quickly coupled to the one-touch pipe connection device 200 without separating the cap portion 130 and the first sealing member 120 from the pipe fitting portion 111.

After the coupling between the pipe 10 to be connected and the one-touch pipe connection device 200 is complete, when a worker holding the cap portion 130 starts to rotate the cap portion 130 in a locking direction, as illustrated in FIG. 15, the cap portion 130 is moved in the insertion direction I by the screw coupling between the first screw coupling portion 113 and the second screw coupling portion 137, in a direction in which the distance between the pressure guide portion 140 and the guide support groove portion 112 decreases, to be coupled to the pipe fitting portion 111.

Accordingly, the pressure guide portion 140 is moved in a direction closer to the guide support groove portion 112, according to the movement of the cap portion 130 in the insertion direction I, to press the other side of the first sealing member 120 in the lengthwise direction in the insertion direction I, causing the flexural deformation of the first sealing member 120.

The other side of the first sealing member 120 in the lengthwise direction pressed by the pressure guide portion 140 as above has flexural deformation while sliding along the inclined surface formed on the pressure guide portion 140 pressing the other side of the first sealing member 120 in the lengthwise direction. Accordingly, the end portion of the other side of the first sealing member 120 in the lengthwise direction is bent toward the side of the insertion direction I and deformed to protrude in the direction toward the center of the ring-shaped portion 131.

As the end portion of the other side of the first sealing member 120 in the lengthwise direction is deformed to protrude in the direction toward the center of the ring-shaped portion 131, the other side of the first sealing member 120 in the lengthwise direction closely contacts the outer circumferential surface of the pipe 10 to be connected inserted in the pipe fitting portion 111 and fastens the pipe 10 to be connected from the outside. Due to the deformed shape of the other side of the first sealing member 120 in the lengthwise direction, the one side of the first sealing member 120 in the lengthwise direction receives a force in the opposite direction to the direction in which the other side of the first sealing member 120 in the lengthwise direction protrudes. Accordingly, the one side of the first sealing member 120 in the lengthwise direction firmly and closely contacts the outer support wall 112b of the pipe fitting portion 111.

Accordingly, since adhesion strength between the pipe fitting portion 111 and the first sealing member 120, and adhesion strength between the pipe 10 to be connected inserted in the pipe fitting portion 111 and the first sealing member 120 provided in the pipe fitting portion 111, are reinforced, the pipe 10 to be connected may be firmly fixed to the one-touch pipe connection device 200 without detachment therefrom, and sealing performance between the pipe fitting portion 111 and the pipe 10 to be connected may be further improved.

Furthermore, the first sealing member 120 closely contacting the outer circumferential surface of the pipe 10 to be connected and fastening the pipe 10 to be connected from the outside protrudes in the direction toward the center of the ring-shaped portion 131 by the flexural deformation and simultaneously the end portion of the other side thereof is bent toward the side of the insertion direction I. As such, while closely contacting the outer circumferential surface of the pipe 10 to be connected, the end portion of the first sealing member 120 bent toward the side of the insertion direction I applies a force to the pipe 10 to be connected to be pushed toward the side of the insertion direction I.

By the pressing of the end portion of the first sealing member 120 as above, the pipe 10 to be connected receives a force in a direction in which the end portion thereof in the lengthwise direction closely contacts the second sealing member 225. Accordingly, in the socket main body portion 110 provided with the second sealing member 225, since the end portion of the pipe 10 to be connected in the lengthwise direction and the second sealing member 225 are strongly and closely contacted with each other, sealing performance between the end portion of the pipe 10 to be connected in the lengthwise direction and the socket main body portion 110 may be further improved.

In other words, by simply coupling the cap portion 130 to the pipe fitting portion 111, the pipe 10 to be connected may be firmly fixed to the one-touch pipe connection device 200 without detachment therefrom and the pipe 10 to be connected may be connected to the one-touch pipe connection device 200. Furthermore, by using the shape deformation of the first sealing member 120 which serves to fasten the pipe 10 to be connected and increase a sealing force to the pipe 10 to be connected, sealing capability of the second sealing member 225 may be improved as well.

According to the one-touch pipe connection device 200 according to the present disclosure, when the first sealing member 120, the second sealing member 225, and the cap portion 130 are coupled to the socket main body portion 110, a connection and disconnection work of the pipe 10 to be connected may be performed by slightly releasing the cap portion 130 only without separating the parts, thereby making the pipe connection and disconnection work easy and quick. Furthermore, since there is no concern about loss of various parts required for a pipe connection work, workability may be improved and a work cost may be reduced.

Furthermore, according to the one-touch pipe connection device 200 according to the present disclosure, with a simple work of coupling the cap portion 130 to the pipe fitting portion 111, the pipe 10 to be connected may be firmly fixed to the one-touch pipe connection device 200 without detachment therefrom and the 10 pipe to be connected may be connected to the one-touch pipe connection device 200. Furthermore, the sealing performance by using a sealing operation performed at two different positions using the first sealing member and the second sealing member may be further reinforced.

In summary, the process of connecting the pipe to be connected to the one-touch pipe connection device may be performed in the following order.

(1) Fitting the first sealing member 120 into the guide support groove portion 112.

(2) Connecting the cap portion 130 and the pipe fitting portion 111 such that the ring-shaped portion 131 of the cap portion 130 is loosely placed on the entrance of the pipe fitting portion 111.

(3) Inserting the pipe 10 to be connected in the pipe fitting portion 111 such that the end portion of the pipe 10 to be connected contacts the support step portion 119 in the pipe fitting portion 111.

(4) Rotating the cap portion 130 in a locking direction to be fixed to the pipe fitting portion 111

Referring to FIGS. 16 and 17, a one-touch pipe connection device 300 according to a third embodiment of the present disclosure may include, at an entrance side thereof, a pipe fitting portion 311 where a guide support groove portion 312 is formed, and a socket main body portion 310 including the pipe fitting portion 311.

The inner support wall 112a is formed at one side of the guide support groove portion 312 formed at an entrance side of the pipe fitting portion 311, that is, a side adjacent to an inner circumferential surface of the pipe fitting portion 311, and the outer support wall 112b is formed at other side of the guide support groove portion 312, that is, a side adjacent to the pipe fitting portion 311.

An inner open portion 312c is formed at one side of the guide support groove portion 312 where the inner support wall 112a is formed. The inner open portion 312c is a portion where the inner support wall 112a is not formed, in a portion of one side of the guide support groove portion 312, which corresponds to a portion that opens the one side of the guide support groove portion 312 toward a center of the pipe fitting portion 311.

According to the present embodiment, the inner open portion 312c includes a plurality of inner open portions 312c along an inner circumferential surface of the pipe fitting portion 311, and the inner open portions 312c are formed to be located alternately with the inner support wall 112a along the inner circumferential surface of the pipe fitting portion 311.

As such, in the portion where the inner open portion 312c is formed, the flexural deformation of the first sealing member 120 pressed by the pressure guide portion 140 may freely occur. Accordingly, as the first sealing member 120 is deformed to further protrude in the direction toward the center of the ring-shaped portion 131 through the portion where the inner open portion 312c is formed, the first sealing member 120 may closely contact the outer circumferential surface of the pipe 10 to be connected inserted in the pipe fitting portion 311, by a stronger force.

Accordingly, as the pipe 10 to be connected is inserted in the pipe fitting portion 311 such that no friction may be generated between the pipe 10 to be connected inserted in the pipe fitting portion 311 and the first sealing member 120 in the portion of the pipe fitting portion 311 where the inner support wall 112a is formed, the pipe 10 to be connected may be easily and quickly connected to the one-touch pipe connection device 300. Also, since adhesion strength between the pipe 10 to be connected inserted in the pipe fitting portion 311 and the first sealing member 120 may be further reinforced in the portion of the pipe fitting portion 311 where the inner open portion 312c is formed, the pipe 10 to be connected may be firmly fixed to the one-touch pipe connection device 300 without detachment therefrom, and the sealing performance between the pipe fitting portion 311 and the pipe 10 to be connected may be further improved.

While the present disclosure has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present disclosure as defined by the following claims.

The invention claimed is:
1. A one-touch pipe connection device comprising:
a socket main body portion, wherein a plurality of pipe fitting portions, in each of which a pipe to be connected is inserted, are connected to each other;
a sealing portion provided between the socket main body portion and the pipe to be connected and sealing between the pipe to be connected inserted in the pipe fitting portion and the socket main body portion; and a cap portion having a through hole therein for passing the pipe to be connected inserted in the pipe fitting portion, coupled to the pipe fitting portion while moving in an insertion direction of the pipe to be connected inserted in the pipe fitting portion, and, when coupled to the pipe fitting portion, pressing the sealing portion in a direction in which the sealing portion closely contacts the pipe to be connected, wherein the sealing portion comprises a first sealing member that is provided at a side of an open entrance of the pipe fitting portion coupled to the cap portion and sealing between an inner circumferential surface of the pipe fitting portion and an outer circumferential surface of the pipe to be connected, wherein the cap portion comprises a pressure guide portion that induces flexural deformation of the first sealing member by pressing other side of the first sealing member in a lengthwise direction in the insertion direction when the cap portion moves the insertion direction of the pipe to be connected, wherein a guide support groove portion having a shape corresponding to a surface of an end portion of one side of the first sealing member in the lengthwise direction is formed at a side of an entrance of the pipe fitting portion toward an inner side of the pipe fitting portion in a lengthwise direction from an end portion of an entrance side of the pipe fitting portion, an inner support wall is formed at a side of the guide support groove portion adjacent to the inner circumferential surface of the pipe fitting portion, and an outer support wall is formed at a side of the guide support groove portion adjacent to an outer circumferential surface of the pipe fitting portion, wherein the one side of the first sealing member in the lengthwise direction is supported by the guide support groove portion, and the other side of the first sealing member in the lengthwise direction contacts the pressure guide portion when the cap portion is coupled to the pipe fitting portion, and wherein the first sealing member has an oval section in which a major axis is formed in the insertion direction.

2. The one-touch pipe connection device of claim 1, wherein the first sealing member has an inner diameter equal to or greater than an outer diameter of the pipe to be connected and has an elastically deformable ring shape.

3. The one-touch pipe connection device of claim 1, wherein the first sealing member is fixed at the entrance side of the pipe fitting portion by fitting in the guide support groove portion such that an inner circumferential surface is supported by the inner support wall and an outer circumferential surface supported by the outer support wall.

4. The one-touch pipe connection device of claim 1, wherein, when the cap portion moves in the insertion direction of the pipe to be connected, the end portion of the other side of the first sealing member in the lengthwise direction is inserted, in a wedge shape, in a space formed by the outer circumferential surface of the pipe to be connected and an inclined surface formed on the pressure guide portion, such that one surface of an end portion of the other side of the first sealing member in the lengthwise direction closely contacts the outer circumferential surface of the pipe to be connected and other surface of the end portion of the other side of the first sealing member in the lengthwise direction closely contacts the inclined surface formed on the pressure guide portion.

5. The one-touch pipe connection device of claim 1, wherein, when the cap portion moves in the insertion direction of the pipe to be connected, the other side of the first sealing member in the lengthwise direction slides along an inclined surface formed on the pressure guide portion pressing the other side of the first sealing member in the lengthwise direction, and has flexural deformation in a direction toward a center of the ring-shaped portion.

6. The one-touch pipe connection device of claim 1, wherein the cap portion comprises a ring-shaped portion having the through hole formed therein to pass therethrough and having an inner surface facing an inner side of the pipe fitting portion and an outer surface facing an outer side of the pipe fitting portion, and a skirt portion extending from an edge of the ring-shaped portion in the insertion direction.

7. The one-touch pipe connection device of claim 6, wherein an inclined surface on the pressure guide portion is formed to be inclined from a side of an inner circumferential surface of the skirt portion to a side of an inner circumferential surface of the ring-shaped portion.

8. The one-touch pipe connection device of claim 1, wherein a first screw coupling portion is formed on an outer circumferential surface of an entrance side of the pipe fitting portion, a second screw coupling portion to be screw-coupled to the first screw coupling portion is formed on an inner surface of the cap portion, and the cap portion is coupled to the pipe fitting portion by screw coupling made between the first screw coupling portion and the second screw coupling portion.

9. The one-touch pipe connection device of claim 1, wherein a support step portion is formed between the pipe fitting portion and the pipe connection portion to connect the pipe fitting portion and the pipe connection portion with a step therebetween, and a position of the pipe to be connected inserted in the pipe fitting portion in the insertion direction is restricted as an end portion of one side of the pipe to be connected in the lengthwise direction interference with the support step portion.

10. The one-touch pipe connection device of claim 9, wherein the sealing portion further comprises a second sealing portion that is provided between the support step portion and the pipe to be connected and sealing between the socket main body portion and the end portion of the one side of the pipe to be connected in the lengthwise direction, the support step portion has an outer diameter corresponding to an inner diameter of the pipe fitting portion and includes a flat surface having a ring shape having an inner diameter corresponding to an inner diameter of the pipe connection portion, and the second sealing member includes a flat surface corresponding to the flat surface having a ring shape of the support step portion.

11. The one-touch pipe connection device of claim 1, wherein the socket main body portion comprises a plurality of pipe fitting portions that are connected to each other, forming any one of a "⌐" shape, a "—" shape, a "T" shape, and a "+" shape.

12. The one-touch pipe connection device of claim 1, wherein a grip groove is formed on the cap portion to be concave on an outer circumference surface of the skirt portion and open to outside of the skirt portion and toward the ring-shaped portion, and the grip groove comprises a plurality of grip grooves arranged along a circumferential direction of the cap portion to be spaced apart from each other at an interval.

* * * * *